(12) United States Patent
Hara

(10) Patent No.: US 6,371,748 B1
(45) Date of Patent: Apr. 16, 2002

(54) BACK PRESSURE CONTROL FOR AN INJECTION MOLDING MACHINE

(75) Inventor: Hitoshi Hara, Funabashi (JP)

(73) Assignee: Sumitomo Heavy Industries, LTD, Tokyo (JP)

( * ) Notice: Subject to any disclaimer, the term of this patent is extended or adjusted under 35 U.S.C. 154(b) by 0 days.

(21) Appl. No.: 09/340,503

(22) Filed: Jul. 1, 1999

(30) Foreign Application Priority Data

Jul. 2, 1998 (JP) .......................................... 10-187130

(51) Int. Cl.$^7$ ............................................... B29C 45/77
(52) U.S. Cl. ...................................... 425/145; 264/40.7
(58) Field of Search ............................... 425/145, 149, 425/170; 264/40.7

(56) References Cited

U.S. PATENT DOCUMENTS

| | | | |
|---|---|---|---|
| 5,371,450 A | * 12/1994 | Hiraoka | 425/144 |
| 5,380,181 A | * 1/1995 | Hiraoka et al. | 425/145 |
| 5,518,671 A | * 5/1996 | Takizawa et al. | 425/145 |
| 5,552,690 A | * 9/1996 | Hiraoka | 425/149 |

FOREIGN PATENT DOCUMENTS

| JP | 4-28533 | 5/1992 |
|---|---|---|
| JP | 9-174626 | 7/1997 |

* cited by examiner

*Primary Examiner*—Tim Heitbrink
(74) *Attorney, Agent, or Firm*—Arent Fox Kintner Plotkin & Kahn, PLLC

(57) ABSTRACT

In a back pressure control apparatus for controlling back pressure in an injection molding machine comprising an injection device which comprises a heating cylinder, a screw, and an injection actuator and which is provided with a back pressure detector for producing a pressure detected signal and with a screw position detector for producing a screw position detected signal, the back pressure control apparatus comprises a level setting section for setting a back pressure control level with respect to back pressure. A sharpness selecting section selects, as a selected sharpness, one of a plurality of sharpnesses in transition up to a maximum back pressure command value. On the basis of the back pressure control level, a determining section determines a back pressure pattern having a variable back pressure command value which continuously changes with respect to a retreat position of the screw. The back pressure pattern has a mountain-shaped portion defined by the selected sharpness. Responsive to the pressure detected signal and the screw position detected signal, a controller controls the back pressure in accordance with the back pressure pattern by means of the injection actuator.

28 Claims, 24 Drawing Sheets

BACK PRESSURE CONTROL FOR AN INJECTION MOLDING MACHINE

BACKGROUND OF THE INVENTION

This invention relates to a back pressure control method for an injection molding machine and a back pressure control apparatus therefor.

Injection molding machines are classified into hydraulic injection molding machines and motor-driven injection molding machines. Each hydraulic injection molding machine uses hydraulic actuators as driving sources for an injection device and a clamping device while each motor-driven injection molding machine uses servomotors as the driving sources. Hereinafter, although the description will be made on the premise that the injection molding machines are the motor-driven injection molding machines, the invention is also applicable to hydraulic injection molding machines; the hydraulic injection molding machines and the motor-driven injection molding machines are similar in structure and operation to each other except that there is a difference between the hydraulic actuators and the servomotors. Now, the description will proceed to operations of an injection device using the servomotors as the actuators in brief.

(1) In the plasticization and metering process, a screw is rotated by a screw-rotation servomotor. The screw is located within a heating cylinder. Resin powder is fed, as fed resin, from a hopper to a rear portion of the screw in the heating cylinder. Rotation of the screw results in feeding the fed resin having a predetermined metered amount to a nose portion of the heating cylinder with the fed resin melted by the heating cylinder to form molten resin. During this time duration, the screw is retracted due to pressure (back pressure) of the molten resin which is trapped in the nose portion of the heating cylinder.

The screw has a rear end portion which is directly connected to an injection shaft. The injection shaft is rotatably supported on a pressure plate through a bearing. The injection shaft is driven in an axial direction by an injection servomotor which is supported on the pressure plate. The pressure plate moves forward and backward along a guide bar in response to the operation of the injection servomotor through a ball screw. In the manner which will later become clear, the above-mentioned back pressure of the molten resin is detected by using a load cell and controlled with a feedback control loop.

(2) Subsequently, in a filling process, the pressure plate is advanced by means of driving the injection servomotor. The screw has a nose portion which serves as a piston to fill a mold with the molten resin.

(3) At the end of the filling process, the molten resin fills the space within a cavity of the mold. At this point, the advancing motion of the screw has a control mode which is switched from a velocity control mode to a pressure control mode. This switching is referred to as a "V-P switching".

(4) After the V-P switching, the resin within the cavity of the mold is allowed to cool under a predetermined pressure. This process is called a dwelling process. In the dwelling process, the resin has pressure which is controlled in a feedback control loop in the similar manner which is described in conjunction with the above-mentioned back pressure control.

Subsequently, operation of the injection device returns back to the plasticization and metering process set forth in (1) after the completion of the dwelling process set forth in (4).

On the other hand, in a clamping device, an eject operation for ejecting a solid product out of the mold is carried out in parallel with the plasticization and metering process set forth in (1). The eject operation involves in opening the mold to remove the solid product from the mold by means of an ejector mechanism and thereafter in closing the mold for the resin filling set forth in (2).

In the manner which will later be described in conjunction with FIG. 3, a conventional back pressure control method comprises the steps of setting a plurality of fixed back pressure command values to form a back pressure pattern having the fixed back pressure command values that discontinuously vary with respect to a screw retreat position or a screw retreat time instant and of controlling back pressure so that a back pressure detected value coincides with the back pressure pattern. However, with the conventional back pressure control method, it is impossible to sufficiently appreciate a specific characteristic of resin to be molded and to carry out a multi-stage back pressure control (for example, three-stage or four-stages) unless an injection molding machine operator has rich experiences. Inasmuch as the fixed back pressure command values are mutually related to a screw retreat position, molding work must be carried out by repeatedly changing the fixed back pressure command values until a combination of the fixed back pressure command values is suitable for switching positions depending on the screw position. As a result, this setting work of the conventional injection molding machine requires work both long in time and high in skill.

SUMMARY OF THE INVENTION

It is therefore an object of the present invention to provide a back pressure control method for an injection molding machine, which is capable of carrying out near ideal back pressure control by simple setting work.

It is another object of the present invention to provide a back pressure control apparatus for an injection molding machine, which is suitable to the above-mentioned back pressure control method.

Other objects of this invention will become clear as the description proceeds.

According to a first aspect of this invention, a back pressure control method is of controlling back pressure in an injection molding machine comprising an injection device. The injection device comprises a heating cylinder for heating resin powder therein to melt the resin powder into molten resin, a screw disposed in the heating cylinder for feeding the molten resin in the heating cylinder forward to meter the molten resin, and an injection actuator operatively coupled to the screw for driving the screw along an axial direction to inject the molten resin metered in the heating cylinder forward. The back pressure control method comprises the steps of setting a back pressure control level with respect to the back pressure, of automatically determining, on the basis of the back pressure control level, a back pressure pattern having a variable back pressure command value which continuously changes with respect to a retreat position of the screw, and of controlling the back pressure in accordance with the back pressure pattern.

According to a second aspect of this invention, a back pressure pattern preparing method is of preparing a back pressure pattern for controlling back pressure in an injection molding machine comprising an injection device. The injection device comprises a heating cylinder for heating resin powder therein to melt the resin powder into molten resin and a screw disposed in the heating cylinder for feeding the molten resin in the heating cylinder forward to meter the molten resin. The back pressure pattern preparing method comprises the steps of setting a back pressure control level with respect to the back pressure and of automatically determining, on the basis of the back pressure control level, the back pressure pattern having a variable back pressure command value which continuously changes with respect to a retreat position of the screw to prepare the back pressure pattern.

According to a third aspect of this invention, a back pressure control method is of controlling back pressure in an injection molding machine comprising an injection device. The injection device comprises a heating cylinder for heating resin powder therein to melt the resin powder into molten resin, a screw disposed in said heating cylinder for feeding the molten resin in the heating cylinder forward to meter the molten resin, and an injection actuator operatively coupled to the screw for driving said screw along an axial direction to inject the molten resin metered in the heating cylinder forward. The back pressure control method comprises the steps of setting a back pressure control level with respect to the back pressure, of automatically determining, on the basis of the back pressure control level, a back pressure pattern having a variable back pressure command value which continuously changes with respect to time, and of controlling the back pressure in accordance with the back pressure pattern.

According to a fourth aspect of this invention, a back pressure pattern preparing method is of preparing a back pressure pattern for controlling back pressure in an injection molding machine comprising an injection device. The injection device comprises a heating cylinder for heating resin powder therein to melt the resin powder into molten resin and a screw disposed in the heating cylinder for feeding the molten resin in the heating cylinder forward to meter the molten resin. The back-pressure pattern preparing method comprises the steps of setting a back pressure control level with respect to the back pressure and of automatically determining, on the basis of the back pressure control level, the back pressure pattern having a variable back pressure command value which continuously changes with respect to time to prepare the back pressure pattern.

According to a fifth aspect of this invention, a back pressure control apparatus is for controlling back pressure in an injection molding machine comprising an injection device. The injection device comprises a heating cylinder for heating resin powder therein to melt the resin powder into molten resin, a screw disposed in the heating cylinder for feeding the molten resin in said heating cylinder forward to meter the molten resin, and an injection actuator operatively coupled to the screw for driving the screw along an axial direction to inject the molten resin metered in the heating cylinder forward. The injection device is provided with a back pressure detector for detecting back pressure of the molten resin in said heating cylinder that is metered ahead of the screw to produce a pressure detected signal indicative of a back pressure detected value of the back pressure and with a screw position detector for detecting a retreat position of the screw to produce a screw position detected signal indicative of the retreat position of the screw. The back pressure control apparatus comprises a level setting section for setting a back pressure control level with respect to the back pressure to produce a level set signal indicative of the back pressure control level. Connected to the level setting section, a determining section determines, on the basis of the back pressure control level indicated by the level set signal, a back pressure pattern having a variable back pressure command value which continuously changes with respect to a retreat position of the screw. The determining section produces a pattern signal indicative of the back pressure pattern. Connected to the determining section, the back pressure detector, and the screw position detector, and operatively coupled to the injection actuator, a controller controls, in response to the pressure detected signal and the screw position detected signal, the back pressure in accordance with the back pressure pattern by means of the injection actuator.

According to a sixth aspect of this invention, a back pressure control apparatus is for controlling back pressure in an injection molding machine comprising an injection device. The injection device comprises a heating cylinder for heating resin powder therein to melt the resin powder into molten resin, a screw disposed in the heating cylinder for feeding the molten resin in the heating cylinder forward to meter the molten resin, and an injection actuator operatively coupled to the screw for driving the screw along an axial direction to inject the molten resin metered in the heating cylinder forward. The injection device is provided with a back pressure detector for detecting back pressure of the molten resin in the heating cylinder that is metered ahead of the screw to produce a pressure detected signal indicative of a back pressure detected value of the back pressure and with a screw position detector for detecting a retreat position of the screw to produce a screw position detected signal indicative of the retreat position of said screw. The back pressure control apparatus comprises a level setting section for setting a back pressure control level with respect to the back pressure to produce a level set signal indicative of the back pressure control level. A sharpness selecting section selects, as a selected sharpness, one of a plurality of sharpnesses in transition up to a maximum back pressure command value. Connected to the level setting section and the sharpness selecting section, a determining section determines, on the basis of the back pressure control level indicated by the level set signal, a back pressure pattern having a variable back pressure command value which continuously changes with respect to a retreat position of the screw. The back pressure pattern has a mountain-shaped portion defined by the selected sharpness. The determining section produces a pattern signal indicative of the back pressure pattern. Connected to the determining section, the back pressure detector, and the screw position detector, and operatively coupled to the injection actuator, a controller controls, in response to the pressure detected signal and the screw position detected signal, the back pressure in accordance with the back pressure pattern by means of the injection actuator.

According to a seventh aspect of this invention, a back pressure pattern preparing unit is for preparing a back pressure pattern for controlling back pressure in an injection molding machine comprising an injection device. The injection device comprises a heating cylinder for heating resin powder therein to melt the resin powder into molten resin and a screw disposed in the heating cylinder for feeding the molten resin in the heating cylinder forward to meter the molten resin. The back pressure pattern preparing unit comprises a level setting section for setting a back pressure control level with respect to the back pressure to produce a level set signal indicative of the back pressure control level. Connected to the level setting section, a determining section determines, on the basis of the back pressure control level indicated by the level set signal, the back pressure pattern having a variable back pressure command value which continuously changes with respect to a retreat position of the screw. The determining section produces a pattern signal indicative of the back pressure pattern.

According to an eighth aspect of this invention, a back pressure pattern preparing unit is for preparing a back pressure pattern for controlling back pressure in an injection molding machine comprising an injection device. The injection device comprises a heating cylinder for heating resin powder therein to melt the resin powder into molten resin and a screw disposed in the heating cylinder for feeding the molten resin in the heating cylinder forward to meter the molten resin. The back pressure pattern preparing unit comprises a level setting section for setting a back pressure control level with respect to the back pressure to produce a level set signal indicative of the back pressure control level. A sharpness selecting section for selects, as a selected sharpness, one of a plurality of sharpnesses in transition up to a maximum back pressure command value. Connected to the level setting section and the sharpness selecting section, a determining section determines, on the basis of the back pressure control level indicated by the level set signal, the back pressure pattern having a variable back pressure command value which continuously changes with respect to a retreat position of the screw. The back pressure pattern has a mountain-shaped portion defined by the selected sharpness. The determining section produces a pattern signal indicative of the back pressure pattern.

According to a ninth aspect of this invention, a back pressure control apparatus is for controlling back pressure in an injection molding machine comprising an injection device. The injection device comprises a heating cylinder for heating resin powder therein to melt the resin powder into molten resin, a screw disposed in the heating cylinder for feeding the molten resin in the heating cylinder forward to meter the molten resin, and an injection actuator operatively coupled to the screw for driving said screw along an axial direction to inject the molten resin metered in the heating cylinder forward. The injection device is provided with a back pressure detector for detecting back pressure of the molten resin in said heating cylinder that is metered ahead of the screw to produce a pressure detected signal indicative of a back pressure detected value of the back pressure and with a screw retreat time instant generator for generating a time instant signal indicative of a retreat time instant of the screw. The back pressure control apparatus comprises a level setting section for setting a back pressure control level with respect to the back pressure to produce a level set signal indicative of the back pressure control level. Connected to the level setting section, a determining section determines, on the basis of the back pressure control level indicated by the level set signal, a back pressure pattern having a variable back pressure command value which continuously changes with respect to the retreat time instant of the screw. The determining section produces a pattern signal indicative of the back pressure pattern. Connected to the determining section, the back pressure detector, and the screw retreat time instant generator, and operatively coupled to the injection actuator, a controller controls, in response to the pressure detected signal and the time instant signal, the back pressure in accordance with the back pressure pattern by means of the injection actuator.

According to a tenth aspect of this invention, a back pressure control apparatus is for controlling back pressure in an injection molding machine comprising an injection device. The injection device comprises a heating cylinder for heating resin powder therein to melt the resin powder into molten resin, a screw disposed in the heating cylinder for feeding the molten resin in the heating cylinder forward to meter the molten resin, and an injection actuator operatively coupled to the screw for driving the screw along an axial direction to inject the molten resin metered in the heating cylinder forward. The injection device is provided with a back pressure detector for detecting back pressure of the molten resin in said heating cylinder that is metered ahead of the screw to produce a pressure detected signal indicative of a back pressure detected value of the back pressure and with a screw retreat time instant generator for generating a time instant signal indicative of a retreat time instant of the screw. The back pressure control apparatus comprises a level setting section for setting a back pressure control level with respect to the back pressure to produce a level set signal indicative of the back pressure control level. A sharpness selecting section selects, as a selected sharpness, one of a plurality of sharpnesses in transition up to a maximum back pressure command value. Connected to the level setting section and the sharpness selecting section, a determining section determines, on the basis of the back pressure control level indicated by the level set signal, a back pressure pattern having a variable back pressure command value which continuously changes with respect to time. The back pressure pattern has a mountain-shaped portion defined by the selected sharpness. The determining section produces a pattern signal indicative of the back pressure pattern. Connected to the determining section, the back pressure detector, and the screw retreat time instant generator, and operatively coupled to the injection actuator, a controller controls, in response to the pressure detected signal and the time instant signal, the back pressure in accordance with the back pressure pattern by means of the injection actuator.

According to an eleventh aspect of this invention, a back pressure pattern preparing unit is for preparing a back pressure pattern for controlling back pressure in an injection molding machine comprising an injection device. The injection device comprises a heating cylinder for heating resin powder therein to melt the resin powder into molten resin and a screw disposed in the heating cylinder for feeding the molten resin in the heating cylinder forward to meter the molten resin. The back pressure pattern preparing unit comprises a level setting section for setting a back pressure control level with respect to the back pressure to produce a level set signal indicative of the back pressure control level. Connected to the level setting section, a determining section determines, on the basis of the back pressure control level indicated by the level set signal, the back pressure pattern having a variable back pressure command value which continuously changes with respect to a retreat time instant of the screw. The determining section produces a pattern signal indicative of the back pressure pattern.

According to a twelfth aspect of this invention, a back pressure pattern preparing unit is for preparing a back pressure pattern for controlling back pressure in an injection molding machine comprising an injection device. The injection device comprises a heating cylinder for heating resin powder therein to melt the resin powder into molten resin and a screw disposed in the heating cylinder for feeding the molten resin in the heating cylinder forward to meter the molten resin. The back pressure pattern preparing unit comprises a level setting section for setting a back pressure control level with respect to the back pressure to produce a level set signal indicative of the back pressure control level. A sharpness selecting section selects, as a selected sharpness, one of a plurality of sharpnesses in transition up to a maximum back pressure command value. Connected to the level setting section and the sharpness selecting section, a determining section determines, on the basis of the back pressure control level indicated by the level set signal, the back pressure pattern having a variable back pressure command value which continuously changes with respect to a retreat time instant of the screw. The back pressure pattern has a mountain-shaped portion defined by the selected sharpness. The determining section produces a pattern signal indicative of the back pressure pattern.

DESCRIPTION OF THE PREFERRED EMBODIMENT

Figure 1:
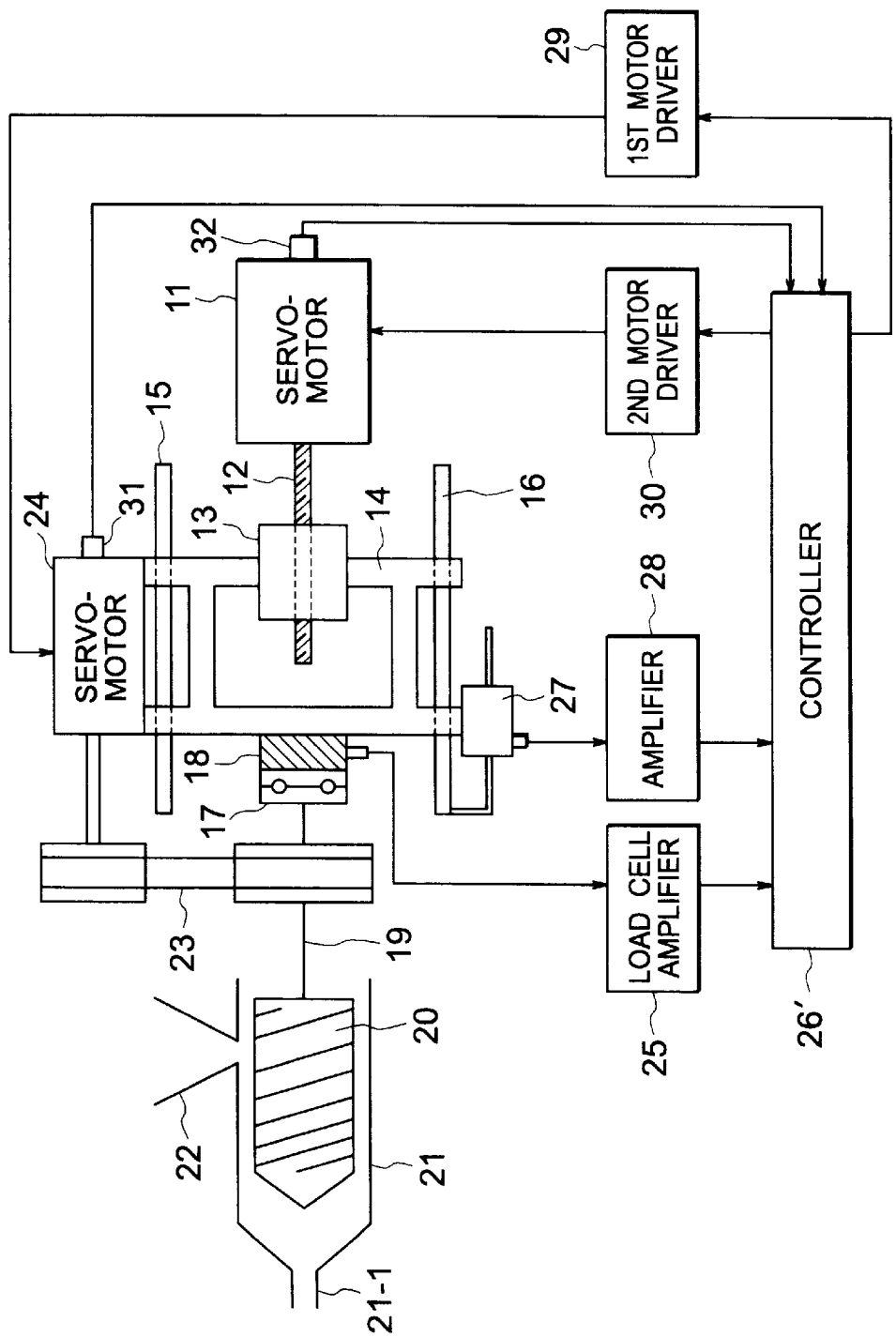
FIG. 1 is a schematic view of a conventional motor-driven injection molding machine which comprises an injection device driven by servomotors.

Referring to FIG. 1, a conventional motor-driven injection molding machine will be described at first in order to facilitate an understanding of the present invention. The illustrated motor-driven injection molding machine carries out a filling of molten resin by converting rotational motion of a servomotor into linear or reciprocating motion using a ball screw and a nut.

In FIG. 1, rotation of an injection servomotor 11 is transmitted to a ball screw 12. A nut 13 is fixed to a pressure plate 14 such that it advances and is retracted in response to the rotation of the ball screw 12. The pressure plate 14 is movable along guide bars 15 and 16 fixed to a base frame (not shown). The back and forth movement of the pressure plate 14 is transmitted to a screw 20 via a bearing 17, a load cell 18, and an injection shaft 19. The screw 20 is positioned within a heating cylinder 21 such that it is rotatable and movable in the axial direction. The heat cylinder 21 corresponding to the rear portion of the screw 20 is provided with a hopper 22 for feeding resin powder. The rotational motion of a screw-rotation servomotor 24 is transmitted to the injection shaft 19 via a coupling member 23 comprised of, for example, a belt and a pulley. In other words, the screw 20 rotates as a result that the injection shaft 19 is rotationally driven by the screw-rotation servomotor 24.

During a plasticization and metering process, molten resin is trapped in the heating cylinder 21 ahead of the screw 20, namely, on the side of a nozzle 21-1 when the screw 20 goes back while rotating in the heating cylinder 21. The molten resin ahead of the screw 21 is then filled in a mold (not shown) and pressurized for molding. Force acting upon the molten resin is detected by the load cell 18 as reaction force, namely, back pressure. The load cell 18 produces a pressure detected signal indicative of the back pressure. The load cell 18 serves as a back pressure detector for detecting the back pressure. The pressure detected signal is amplified by a load cell amplifier 25 into an amplified pressure signal which is then supplied to a controller 26'.

Attached to the pressure plate 14, a position detector 27 detects an amount of movement of the screw 20 to produce a position detected signal indicative of the amount of the movement of the screw 20. The position detected signal is amplified by a position amplifier 28 into an amplified position signal which is then supplied to the controller 26'. The position detector 27 acts as a screw position detector for detecting a screw retreat position. The controller 26' supplies first and second current (torque) commands to first and second motor drivers 29 and 30 depending on the above-mentioned processes for each of values set by an operator.

Responsive to the first current (torque) command, the first motor driver 29 controls a rotation speed of the screw-rotation servomotor 24 by means of controlling a first driving current for the screw-rotation servomotor 24. Responsive to the second current (torque) command, the second motor driver 30 controls an output torque of the injection servomotor 11 by means of controlling a second driving current for the injection servomotor 11. The screw-rotation servomotor 24 is provided with a first encoder 31 for detecting a first rotation speed of the screw-rotation servomotor 24 to produce a first rotation speed signal indicative of the first rotation speed. Likewise, the injection servomotor 11 is provided with a second encoder 32 for detecting a second rotation speed of the injection servomotor 11 to produce a second rotation speed signal indicative of the second rotation speed. The first and the second rotation speed signals are supplied to the controller 26'. In particular, the first rotation speed detected by the first encoder 31 is used for determining a rotation speed of the screw 20.

It is noted that the example configuration illustrated in FIG. 1 is for the sake of simplicity and convenience. A specific configuration of this example is described in, for example, Japanese Unexamined Patent Publication of Tokkai No. Hei 9-174,626 or JP-A 9-174,626 which are hereby incorporated by reference. Other configurations may also be used, as will be apparent to those skilled in the art.

Figures 2A, 2B:
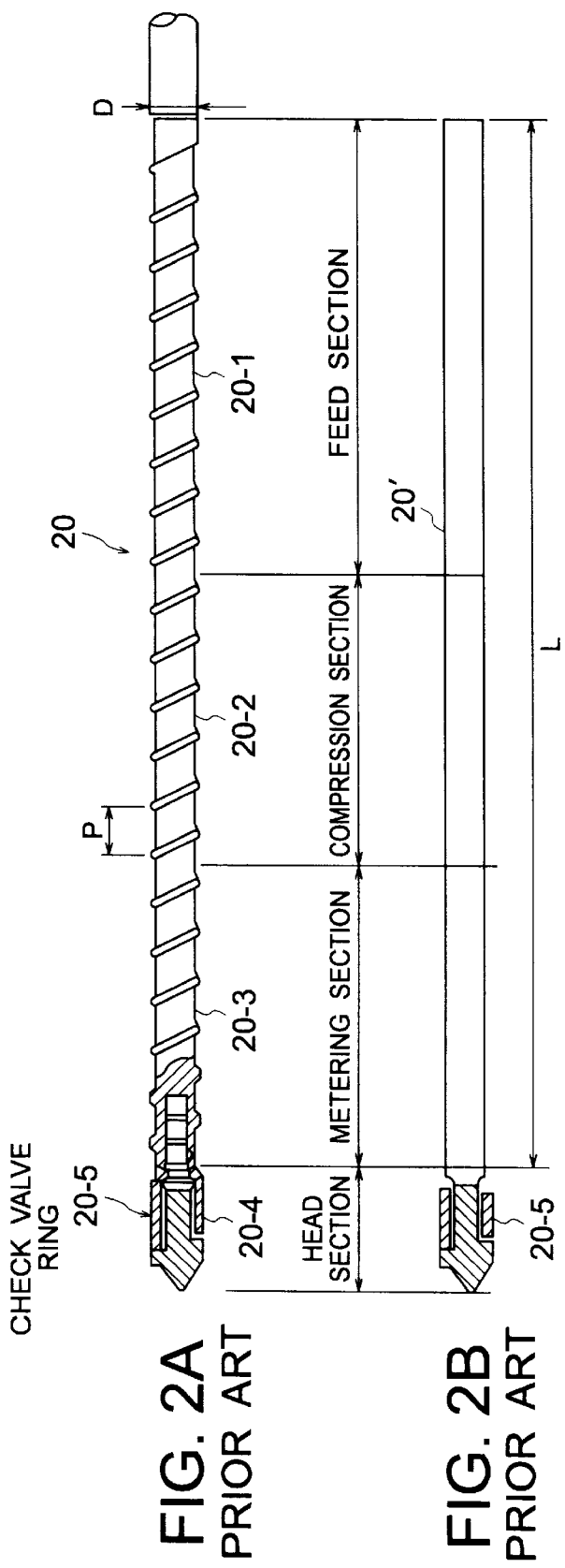
FIGS. 2A and 2B are explanatory views collectively showing a configuration of a screw for use in the conventional motor-driven injection molding machine illustrated in FIG. 1.

Referring to FIGS. 2A and 2B, description will proceed to the screw 20 in detail. As shown in FIG. 2A, the screw 20 is formed of four sections: a feed section 20-1, a compression section 20-2, a metering section 20-3, and a head section 20-4. The feed section 20-1 is for feeding the resin powder from the hopper 22 (FIG. 1) in a solid state or a partially molten state. The resin has temperature which is increased up to around a melting point at the feed section 20-1. Under the circumstances, the feed section 20-1 typically has a rod-shaped member 20' (FIG. 2B) of a generally constant diameter along the length thereof and a helical groove in the peripheral surface thereof.

Supplied from the feed section 20-1 to the compression section 20-2, the resin powder comprises a lot of resin grains which are spaced apart from each other. As a result, molten resin in the compression section 20-2 has approximately half the volume of the resin powder. The compression section 20-2 is for reducing the space through which the resin powder is allowed to pass, in order to make up for the reduced volume. This compression can be achieved by means of tapering the rod-shaped member 20' at the position corresponding to the compression section 20-2 to make the helical groove shallow. The compression section 20-2 compresses the molten resin, enhances an exothermic effect caused by friction, and increases the pressure of the molten resin to push back to the hopper 22 air in the heating cylinder 21, moisture and volatile gas contained in the air and contaminated in the molten resin. As is apparent from the above-description, the heat cylinder 21 has the resin pressure of the highest level in the compression section 20-2.

The rod-shaped member 20' has the largest diameter in a region corresponding to the metering section 20-3. The metering section 20-3 has the shallowest helical groove formed in the rod-shaped member 20'. The molten resin is subjected to large shearing force in the metering section 20-3 and is heated to uniform temperature with an internal exothermic reaction. A predetermined amount of the molten resin is then fed towards the nozzle side in the heating cylinder 21.

The feeding of the molten resin from the metering section 20-3 to the nozzle side is performed through a check valve ring 20-5 in the head section 20-4. The check valve ring 20-5 is located at a position in the vicinity of the left-hand side in the figure during the metering process. In this state, the molten resin can be fed from the metering section 20-3 to the nozzle side.

After the completion of the metering process, the check valve ring 20-5 moves to the right-hand side in the figure because of a pressure difference. As a result, the molten resin is prevented from flowing back away from the nozzle side to the metering section 20-3. The head section 20-4 is typically formed separately from the rod-shaped member 20'. The head section 20-4 has a male thread formed in the root portion thereof. The rod-shaped member 20' has a female thread formed in an end thereof. The head section 20-4 is coupled to the rod-shaped member 20' by means of engaging the male thread formed in the head section 20-4 with the female thread formed in the rod-shaped member 20'. To this end, the root portion of the head section 20-4 is significantly smaller in diameter than the rod-shaped member 20'.

Now, the description will proceed to a conventional back pressure control method which is disclosed in, for example, Japanese Examined Patent Publication of Tokkou No. Hei 4-28,533 or JP-B 4-28,533. The conventional back pressure control method comprises the steps of converting a retreat motion of an injection plunger (the screw 20) into a rotary motion and of controlling back pressure of the injection plunger in a charging process for molding material by controlling rotational force of the rotary motion. Specifically, responsive to the retread motion of the injection plunger, a screw shaft rotates. The screw shaft has an end portion which is mechanically connected to a motor serving as a back pressure controller for controlling rotational force of the screw shaft. Control of driving force of the motor is carried out by a feedback control system where pressure of molten material or retreat force (thrust force) of the injection plunger during the charging process is electrically measured as a feedback signal indicative of back pressure of the injection plunger and feedback control is carried out so that the back pressure of the injection plunger has a pressure detected value which coincides with one of pressure command values at a time.

Figure 3:
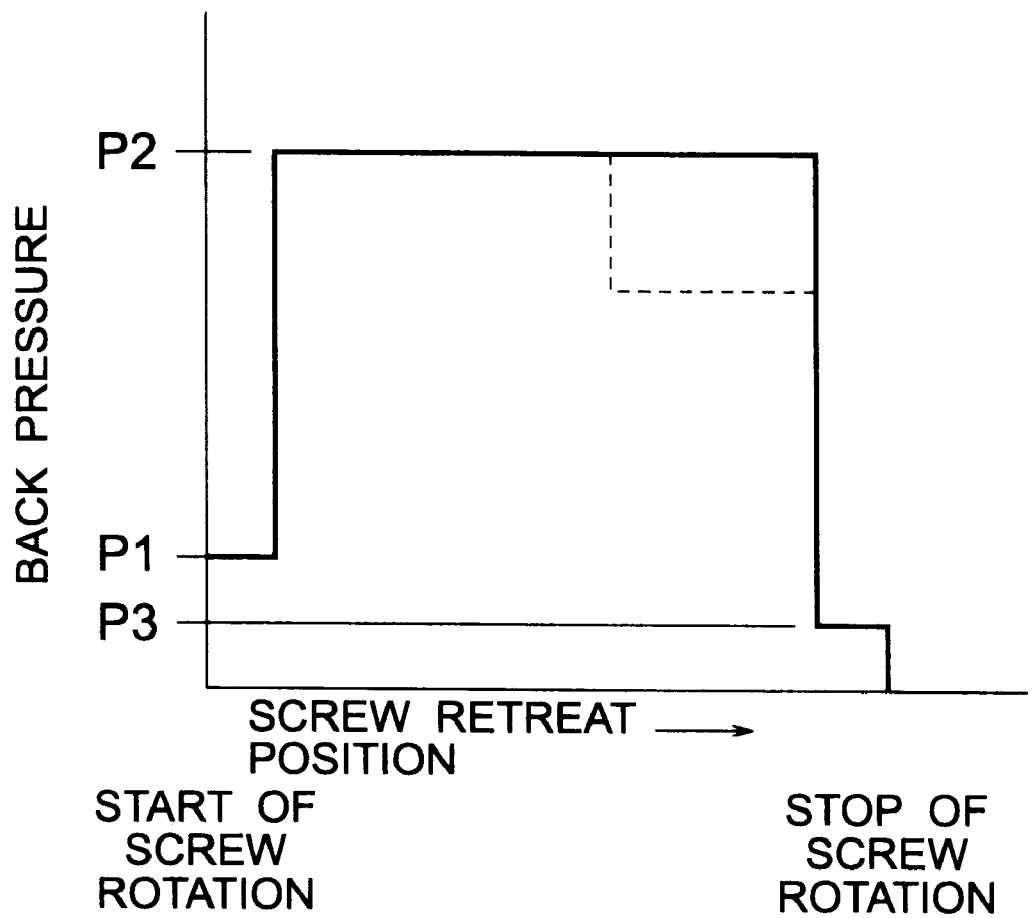
FIG. 3 is a view for use in describing an example of setting of back pressure in the conventional motor-driven injection molding machine.

FIG. 3 shows an example for setting back pressure required to the conventional back pressure control. In FIG. 3, the abscissa and the ordinate represent a screw retreat position and back pressure, respectively. In a known back pressure control including the back pressure control disclosed in the above-mentioned JP-B 4-28,533, first through third fixed back pressure command values P1, P2, and P3 are usually set in accordance with the screw retreat position by an operator. In this event, the first fixed back pressure command value P1 is less than the second fixed back pressure command value P2 and is more than the third fixed back pressure command value P3. According to circumstance, four fixed back pressure command values including another fixed back pressure command value depicted at a broken line may be set in accordance with the screw retreat position. In addition, current or an output torque of the motor is controlled so that the pressure detected value coincides with one of the fixed back pressure command values at a time.

The description will proceed to the reason why a multi-stage back pressure setting is required. Attention will be directed to immediately after start of screw rotation in a plasticization and metering process. In this event, inasmuch as the retreat force of the screw backward become not sufficiently high, it is necessary to set the back pressure so as to have the first fixed back pressure command value P1. This is because volume compression occurs in bubbles within the resin in the helical groove of the screw 20 or the resin trapped ahead of the head section 29-4 of the screw 20 or the resin is not yet sufficiently chewed in the feed section 20-1 of the screw 20.

Thereafter, it will be assumed that the screw 20 normally starts to retreat. Under the circumstances, suitable back pressure having the second fixed back pressure command value P2 is required. With the screw retreat, the feed section 20-1 of the screw 20 has a short effective length and it results in decreasing the retreat force of the screw 20. The reason why the feed section 20-1 of the screw 20 has the short effective length is that the screw 20 retreats as a whole although the hopper 22 is located at a fixed position. Accordingly, it is necessary to decrease the back pressure in response to the retreat force of the screw 20.

Attention will be directed to immediately before completion of the plasticization and metering process. In this event, control is normally made so as to decrease the rotation speed of the screw 20 in order to prevent the screw 20 from retreating over a target. There is resin, such as polyamide resin and so on, where the screw retreat is easily led into a changeable state if the rotation speed of the screw 20 is low. Accordingly, it is necessary to lower the back pressure acting as resistance of the screw retreat, as illustrated at the third fixed back pressure command value P3 in FIG. 3.

As is apparent from the above-mentioned description, for the conventional back pressure control method it is necessary to have an operator who sufficiently appreciates a specific characteristic of resin to be molded and to carry out a multi-stage back pressure setting of three-stage or four-stage on the basis of this operator's rich experiences. Inasmuch as the fixed back pressure command values are mutually related to the screw retreat position, molding work must be carried out by repeatedly changing the fixed back pressure command values until a combination of the fixed back pressure command values is suitable for switching positions depending on the screw position. As a result, setting work of the conventional injection molding machine requires work both long in time interval and high in skill, as mentioned above.

Figure 4:
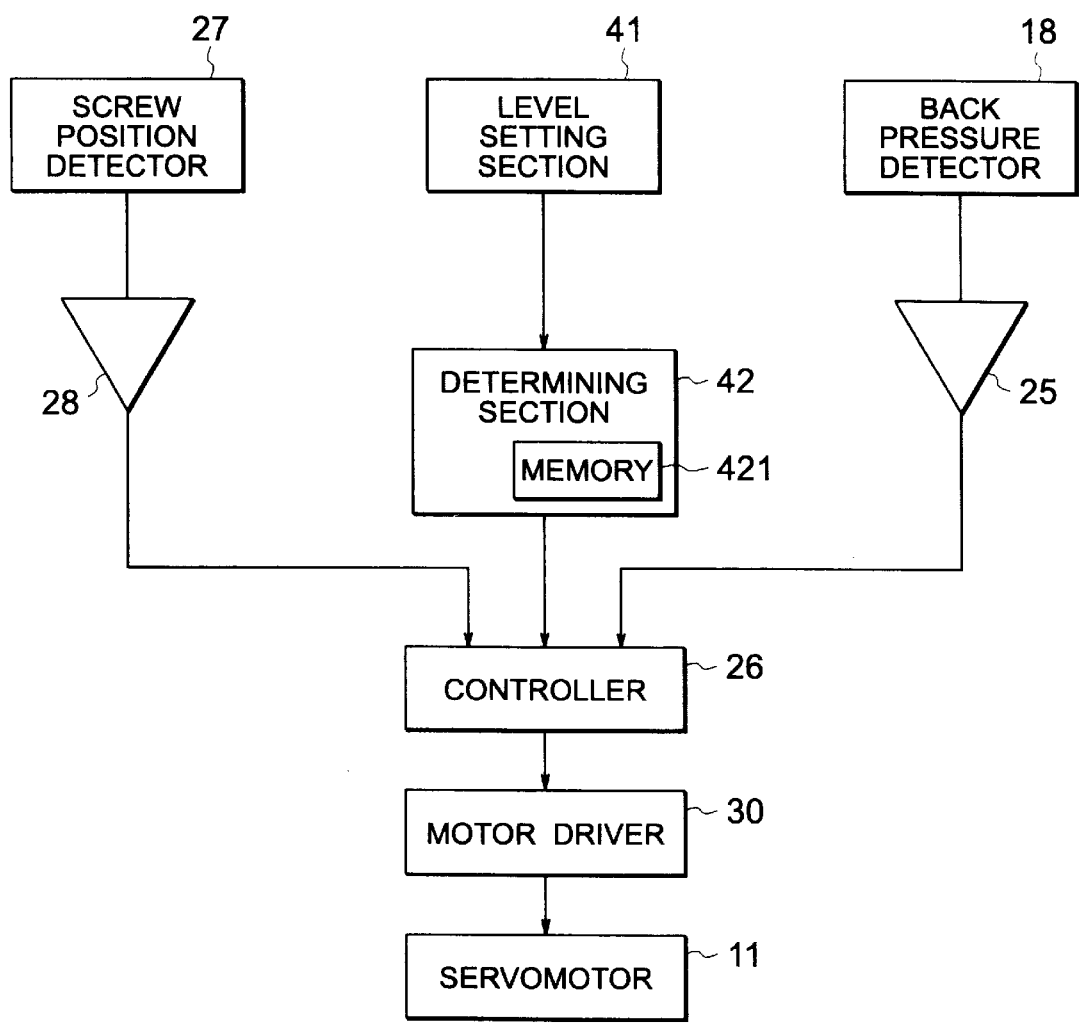
FIG. 4 is a block diagram of a back pressure control apparatus according to a first embodiment of this invention.

Referring to FIG. 4, the description will proceed to a back pressure control apparatus according to a first embodiment of this invention in conjunction with a motor-driven injection molding machine. The illustrated back pressure control apparatus comprises a level setting section 41, a determining section 42, the back pressure detector 18, the screw position detector 27, and a controller 26.

The level setting section 41 is for setting a back pressure control level with respect to the back pressure. The level setting section 41 produces a level set signal indicative of the back pressure control level. The level set signal is supplied to the determining section 42. In the manner which will become clear as the description proceeds, the determining section 42 determines, on the basis of the back pressure control level, a back pressure pattern having a variable back pressure command value which continuously changes with respect to a screw retreat position. The determining section 42 produces a pattern signal indicative of the back pressure pattern. The pattern signal is supplied to the controller 26. At any rate, a combination of the level setting section 41 and the determining section serves as a back pressure pattern preparing unit for preparing the back pressure pattern with respect to the screw retreat position.

The back pressure detector 18 detects the back pressure of the metered molten resin within the heating cylinder 21 that is metered ahead of the screw 20 to produce the back pressure detected signal indicative of a back pressure detected value. The back pressure detected signal is supplied to the controller 26 through the amplifier 25. The screw position detector 27 detects the retreat position of the screw 20 to produce the screw retreat position detected signal indicative of the screw retreat position. The screw retreat position detected signal is supplied to the controller 26 via the amplifier 28. Responsive to the back pressure detected signal and the screw retreat position detected signal, the controller 26 carries out back pressure control in accordance with the pattern signal by means of controlling the injection servomotor 11 via the motor driver 30.

Set by the level setting section 41, the back pressure control level has a value given with respect to the back pressure. The back pressure control level has a value which may be an average value of the back pressure or an average value of a total work amount of the back pressure. However, the value of the back pressure control level merely represents a numerical value as a criterion and may be, for example, settable to one selected from numerical values 0 through 99. The numerical value itself is not important. Determined on the basis of the back pressure control level, the back pressure pattern is an important element in the manner which will presently be described.

Figure 5:
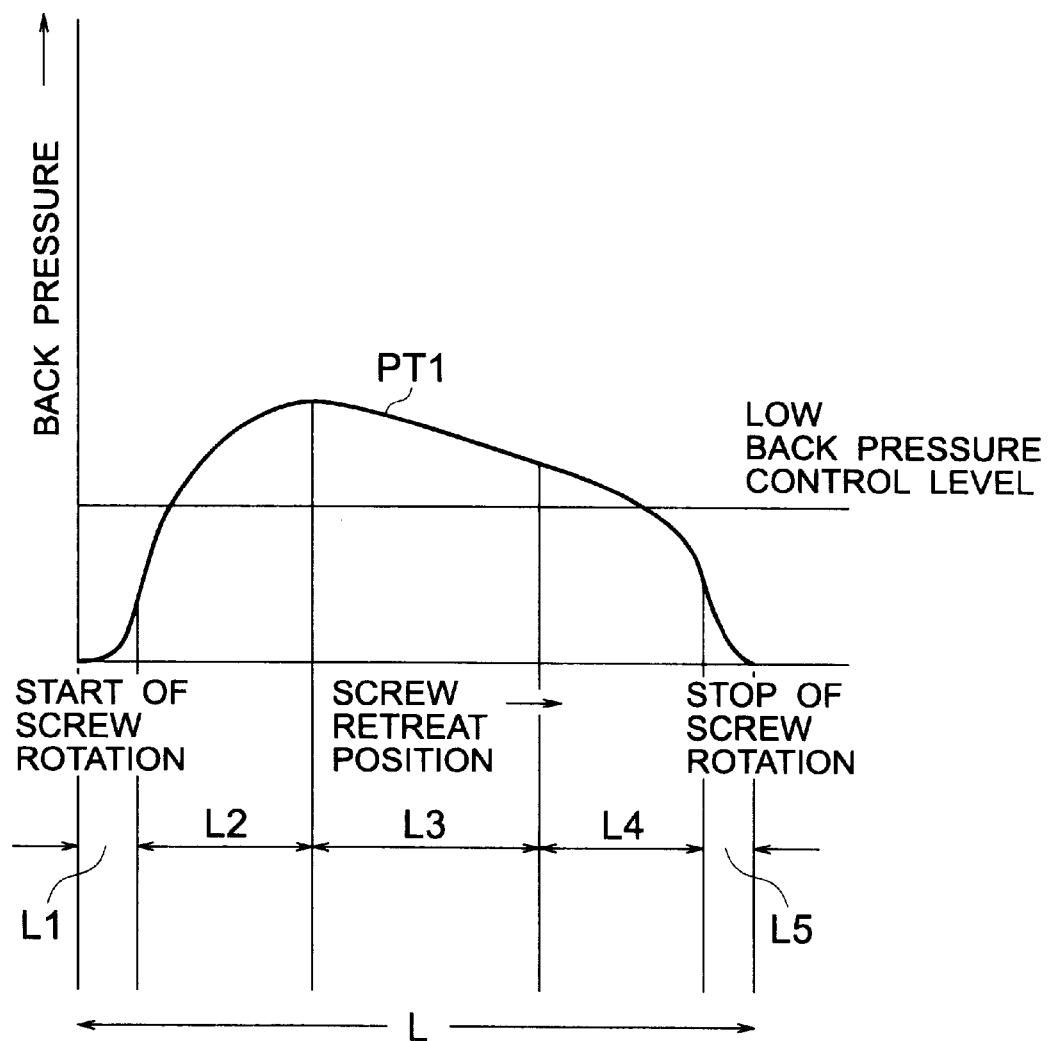
FIG. 5 is a view showing a relationship between a low back pressure control level and a first back pressure pattern for use in the back pressure control in the back pressure control apparatus illustrated in FIG. 4.
Figure 6:
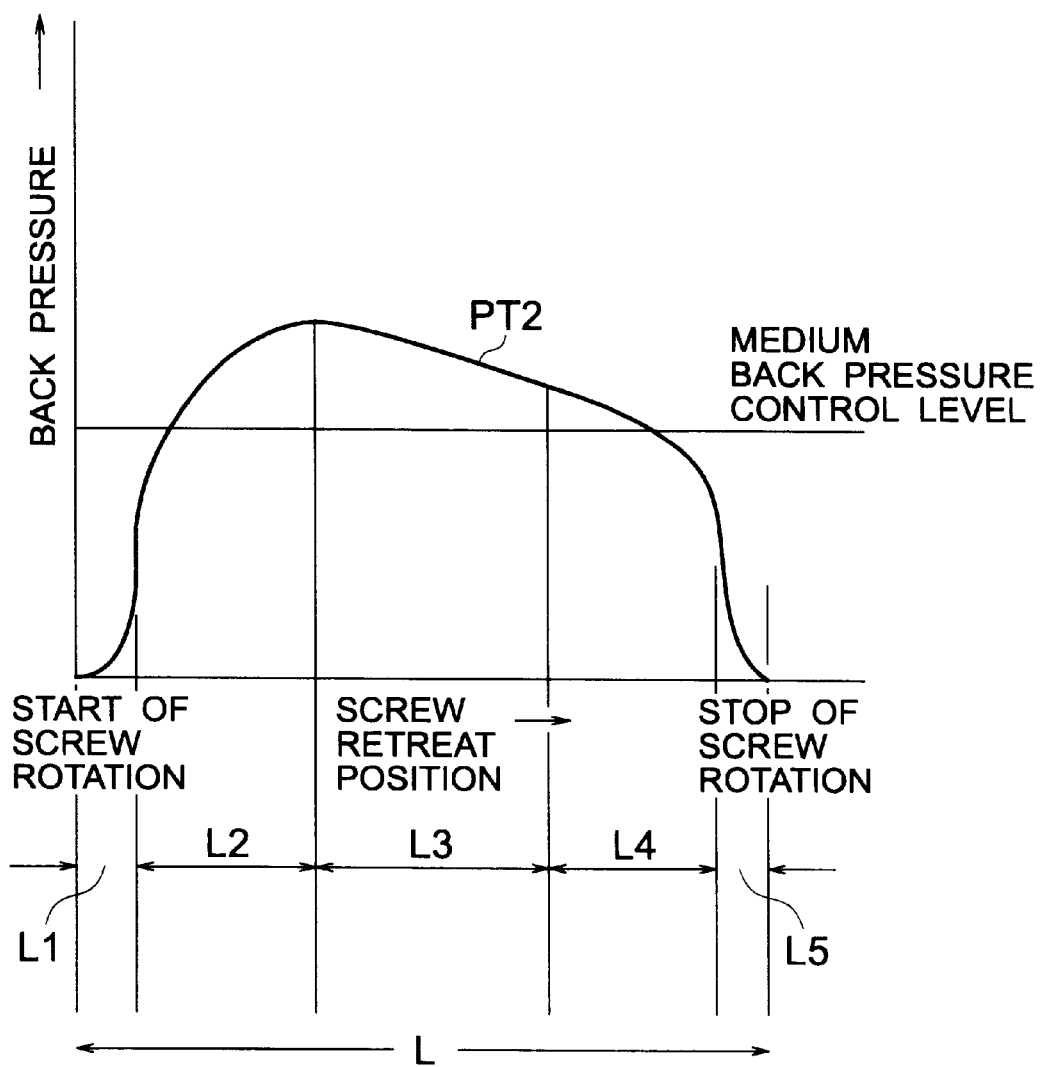
FIG. 6 is a view showing a relationship between a medium back pressure control level and a second back pressure pattern for use in the back pressure control in the back pressure control apparatus illustrated in FIG. 4.
Figure 7:
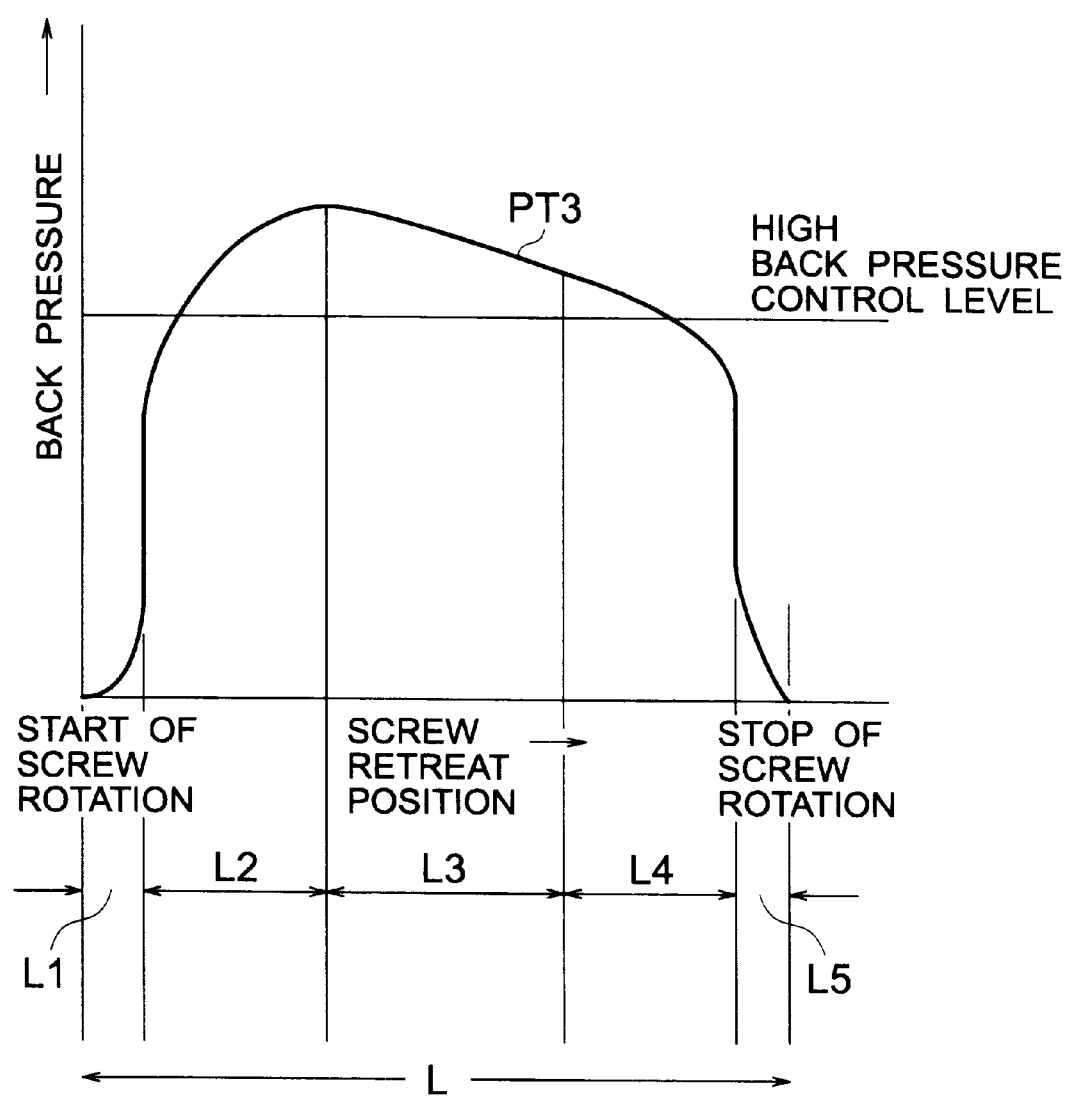
FIG. 7 is a view showing a relationship between a high back pressure control level and a third back pressure pattern for use in the back pressure control in the back pressure control apparatus illustrated in FIG. 4.

Referring to FIGS. 5, 6, and 7 in addition to FIG. 4, the description will proceed to back pressure patterns produced by the determining section 42. In FIGS. 5 through 7, the abscissa and the ordinate represent the screw retreat position and the back pressure, respectively. FIG. 5 shows a first back pressure pattern PT1 when the back pressure control level set by the level setting section 41 is low. FIG. 6 shows a second back pressure pattern PT2 when the back pressure control level set by the level setting section 41 is medium. FIG. 7 shows a third back pressure pattern PT3 when the back pressure control level set by the level setting section 41 is high.

In FIGS. 5 through 7, each of the first through the third back pressure patterns PT1, PT2, and PT3 is defined by the screw retreat position corresponding to the start of the screw rotation and the screw retreat position corresponding to the stop of the screw rotation. Specifically, between the screw retreat position between the start of the screw rotation and the stop of the screw rotation, a screw movement stroke is represented by L. The screw movement stroke L is divided into a plurality of divided stroke regions as a unit of L/10 which is one-tenth as large as the screw movement stroke L.

In the example being illustrated, the screw movement stroke L is divided into first through fifth divided stroke regions L1, L2, L3, L4, and L5 in the order in which the screw retreat position is shifted from a start position for the start of the screw rotation to a stop position for the stop of the screw rotation. Each of the first and the fifth divided stroke regions L1 and L5 has a length L/10 which is one-tenths as large as the screw movement stroke L. The first divided stroke region L1 is called a start divided stroke region while the fifth divided stroke region L5 is called a final divided stroke region. Each of the second and the fourth divided stroke regions L2 and L4 has a length 2L/10 which is two-tenths as large as the screw movement stroke L. The second divided stroke region L2 is referred to as a leading divided stroke region while the fourth divided stroke region L4 is referred to as a trailing divided stroke region. The third divided stroke region L3 has a length 4L/10 which is four-tenths as large as the screw movement stroke L. The third divided stroke region L3 is called an intermediate divided stroke region.

As illustrated in FIGS. 5 through 7, at the first or the start divided stroke region L1 immediately after the start of the screw rotation, each of the first through the third back pressure patterns PT1, PT2, and PT3 has a variable back pressure command value which shifts from a zero back pressure command value to a start low back pressure command value. At the second or the leading divided stroke region L2, each of the first through the third back pressure patterns PT1, PT2, and PT3 has a variable back pressure command value which rises from the start low back pressure command value up to a maximum back pressure command value. At the third or the intermediate divided stroke region L3, each of the first through the third back pressure patterns PT1, PT2, and PT3 has a variable back pressure command value which gently falls from the maximum back pressure commend value to a medium back pressure command value. At the fourth or the trailing divided stroke region L4, each of the first through the third back pressure patterns PT1, PT2, and PT3 has a variable back pressure command value which relatively abruptly falls from the medium back pressure command value to a final low back pressure command value. At the fifth or the final divided stroke region L5, each of the first through the third back pressure patterns PT1, PT2, and PT3 has a variable back pressure command value which shifts from the final low back pressure command value to a zero back pressure command value.

As a result, it is possible to obtain the back pressure pattern having the variable back pressure command value which continuously changes with the back pressure command value related to the screw retreat position with a one-to-one correspondence.

As shown in FIGS. 5 through 7, each of the first through the third back pressure patterns PT1, PT2, and PT3 has a mountain-shaped portion except for portions corresponding to the first and the final divided stroke regions L1 and L5. Responsive to the back pressure control level set by the level setting section 41, the mountain-shaped portion of the back pressure pattern shifts up and down along the ordinate. For this purpose, the determining section 42 includes a memory 421 for preliminarily storing the mountain-shaped portion of the back pressure pattern as a standard configuration.

Now, the description will proceed to operation of the back pressure control apparatus illustrated in FIG. 4. An operator first operates the level setting section 41 to make the level setting section 41 set the back pressure control level. The level set signal indicative of the back pressure control level is supplied to the determining section 42. Responsive to the level set signal, the determining section 42 determines, on the basis of the back pressure control level, the back pressure pattern as illustrated in FIGS. 5 through 7 to produce the pattern signal indicative of the back pressure pattern. The pattern signal is supplied to the controller 26. The controller 26 is also supplied with the screw position detected signal indicative of the screw retreat position from the screw position detector 27 through the amplifier 28 and with the pressure detected signal indicative of the back pressure detected value from the back pressure detector 18 through the amplifier 25. Responsive to the screw retreat position indicated by the screw position detected signal, the controller 26 carries out back pressure control so that the back pressure detected value coincides with the variable back pressure command value indicated by the back pressure pattern that corresponds to the screw retreat position. Specifically, the controller 26 recognizes a current screw retreat position from the screw position detected signal detected by the screw position detector 27 after the screw 20 begins to rotate. Subsequently, the controller 26 compares the back pressure detected value with a current back pressure command value in the pattern signal that corresponds to the current screw retreat position to obtain a current pressure difference between the back pressure detected value and the current back pressure command value. Thereafter, the controller 26 controls a current or an output torque of the injection servomotor 11 via the motor driver 30 so that the current pressure difference becomes zero or becomes approximately zero.

In addition, as described above, the back pressure pattern has the final low back pressure command value at the fifth or the final divided stroke region L5. As a result, although the rotation speed of the screw 20 decreases at the fifth or the final divided stroke region L5, the screw retreat is not changeable and the screw 20 does not race at this position. Although the first through the fifth divided stroke regions L1 to L5 have lengths which are one-tenths, two-tenths, four-tenths, two-tenths, and one-tenths as large as the screw movement stroke L, respectively, in the above-mentioned embodiment, each of the first through the fifth divided stroke regions L1 to L5 may have a length which is suitably selected.

As is described in conjunction with FIG. 3, in the conventional back pressure control method, the operator must set three fixed back pressure command values: the first fixed back pressure command value P1 immediately after start of screw rotation in a plasticization and metering process, the third fixed back pressure command value P3 immediately before completion of the plasticization and metering process, and the second fixed back pressure command value P2 during a normal plasticization and metering process. Preferably, the operator must set four fixed back pressure control values as illustrated in a broken line of FIG. 3. In addition, as regards a combination of a plurality of fixed back pressure command values and switching positions therebetween, the operator is required to have experience as to how the retreat of the screw 20, namely, chewing and kneading, goes smoothly.

In contrast to this, in the back pressure control apparatus according to the first embodiment of this invention, the operator may set only one back pressure control level by means of the level setting section 41 and then the back pressure pattern is automatically determined or prepared by the determining section 42. In this event, the operator may first set the back pressure control level rather low and subsequently may rise the back pressure control level in consideration of conditions of the retreat of the screw 20, states of gas discharged from the molten resin in the nose portion of the heating cylinder 21, or color of the resin. Such work is extremely easy in comparison with conventional setting work for the combination of the fixed back pressure command values and the switching positions therebetween and a high level of skill thereof is not necessary.

The back pressure control apparatus illustrated in FIG. 4 prepares or produces the back pressure pattern having only one mountain-shaped portion. That is, the back pressure pattern has only one type of mountain-shaped portion. However, the back pressure control apparatus preferably may prepare or produce the back pressure pattern having one selected from a plurality of mountain-shaped portions in the manner which will presently be described. In other words, the back pressure pattern may have two or more types of mountain-shaped portions.

Figure 8:
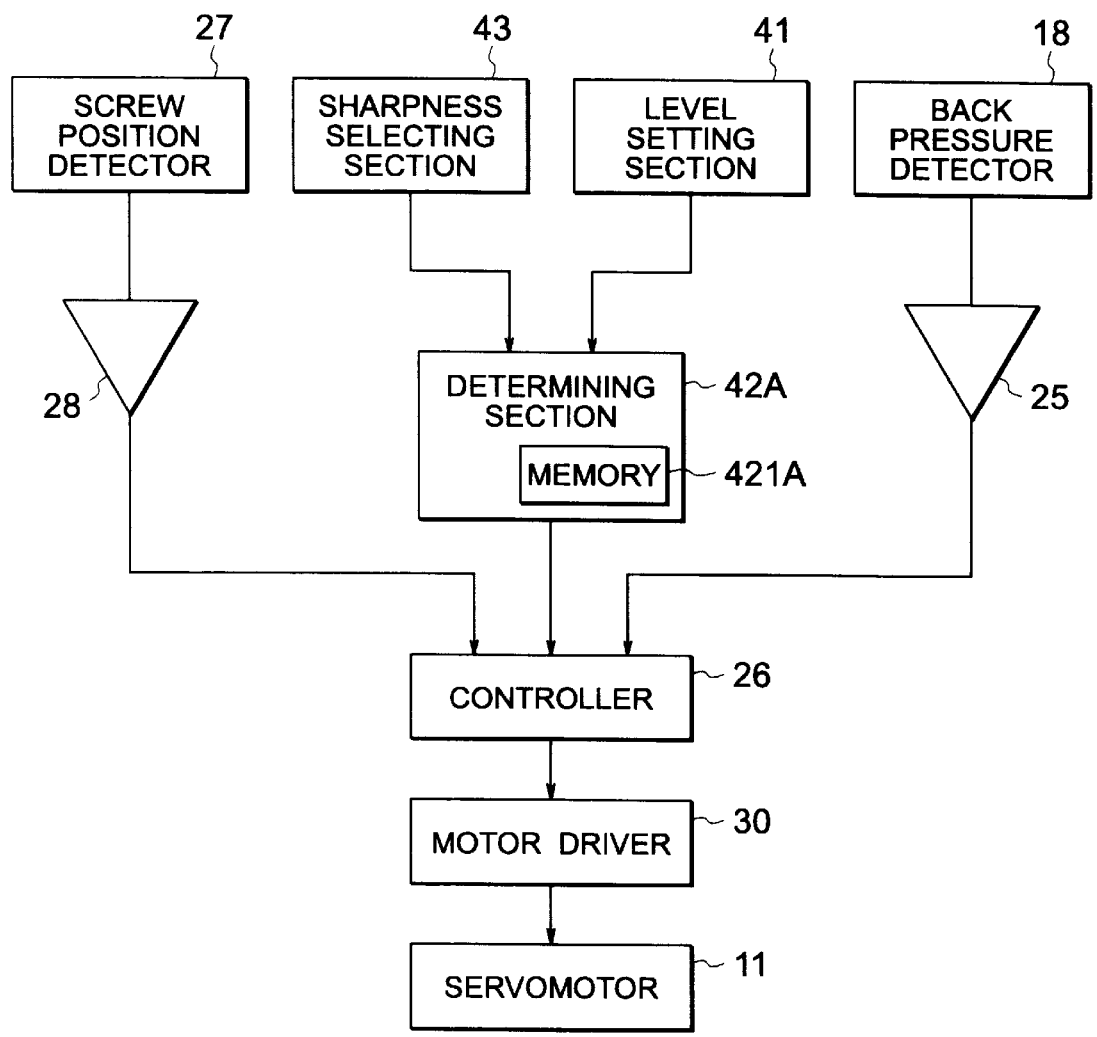
FIG. 8 is a block diagram of a back pressure control apparatus according to a second embodiment of this invention.

Referring to FIG. 8, the description will proceed to a back pressure control apparatus according to a second embodiment of this invention. The illustrated back pressure control apparatus is similar in structure and operation to that illustrated in FIG. 4 except that the back pressure control apparatus further comprises a sharpness selecting section 43 and the determining section is modified from that illustrated in FIG. 4 as will later become clear. The determining section is therefore depicted at 42A.

The sharpness selecting section 43 is for selecting, as a selected sharpness, one of first through third sharpnesses in transition from the start low back pressure command value as it approaches the maximum back pressure command value. The term "sharpness" is used in this specification to mean the rate of change of the slope of the pattern. The first sharpness is a relatively abrupt sharpness while the third sharpness is a relatively gentle sharpness. The second sharpness is a medium sharpness between the first and the third sharpnesses. The first through the third sharpnesses define first through third mountain-shaped portions, respectively. The first mountain-shaped portion has in configuration a relatively abrupt slope while the third mountain-shaped portion has in configuration a relatively gentle slope. The second mountain-shaped portion has in configuration a medium slope between the relatively abrupt slope and the relatively gentle slope. The sharpness selecting section 43 produces a sharpness selected signal indicative of the selected sharpness. The sharpness selected signal is supplied to the determining section 42A.

Responsive to the sharpness selected signal, the determining section 42A determines, on the basis of the back pressure control level, a back pressure pattern having a variable back pressure command value which continuously changes with respect to a screw retreat position in the manner which will become clear as the description proceeds. The determining section 42A produces a pattern signal indicative of the back pressure pattern. The pattern signal is supplied to the controller 26. At any rate, a combination of the level setting section 41, the sharpness selecting section 43, and the determining section 42A is operable as a back pressure pattern preparing unit for preparing the back pressure pattern with respect to the screw retreat position.

Responsive to the back pressure detected signal and the screw retreat position detected signal, the controller 26 carries out back pressure control in accordance with the pattern signal by means of controlling the injection servomotor 11 via the motor driver 30.

Figure 9:
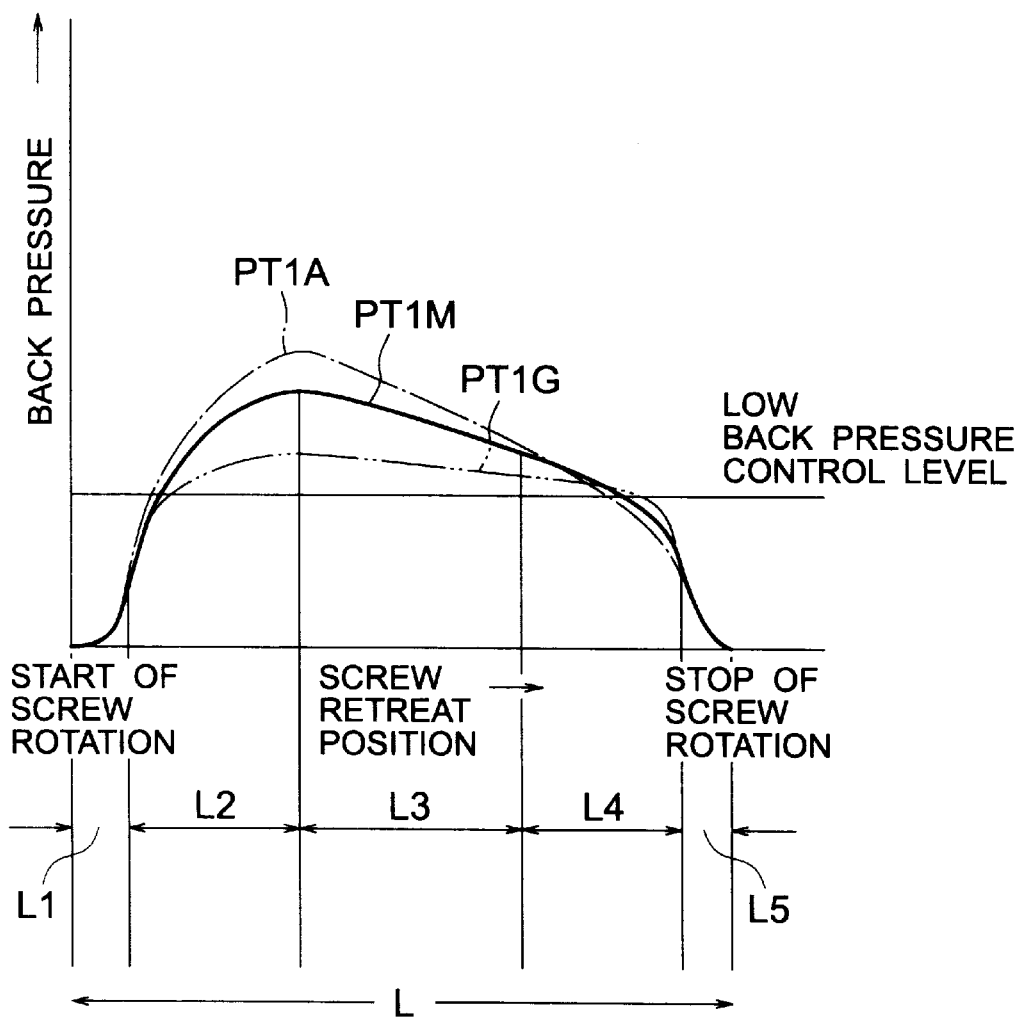
FIG. 9 is a view showing a relationship between a low back pressure control level and three first back pressure pattern for use in the back pressure control in the back pressure control apparatus illustrated in FIG. 8.
Figure 10:
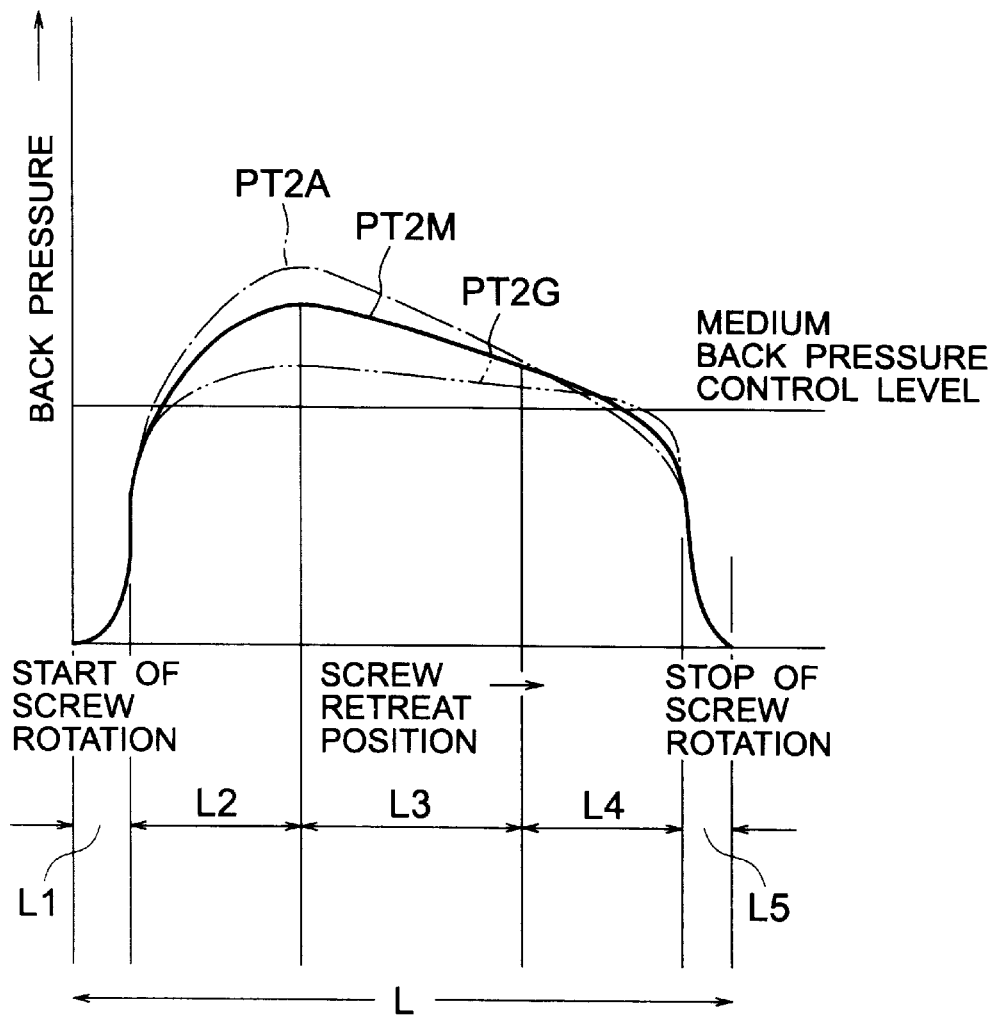
FIG. 10 is a view showing a relationship between a medium back pressure control level and three second back pressure pattern for use in the back pressure control in the back pressure control apparatus illustrated in FIG. 8.
Figure 11:
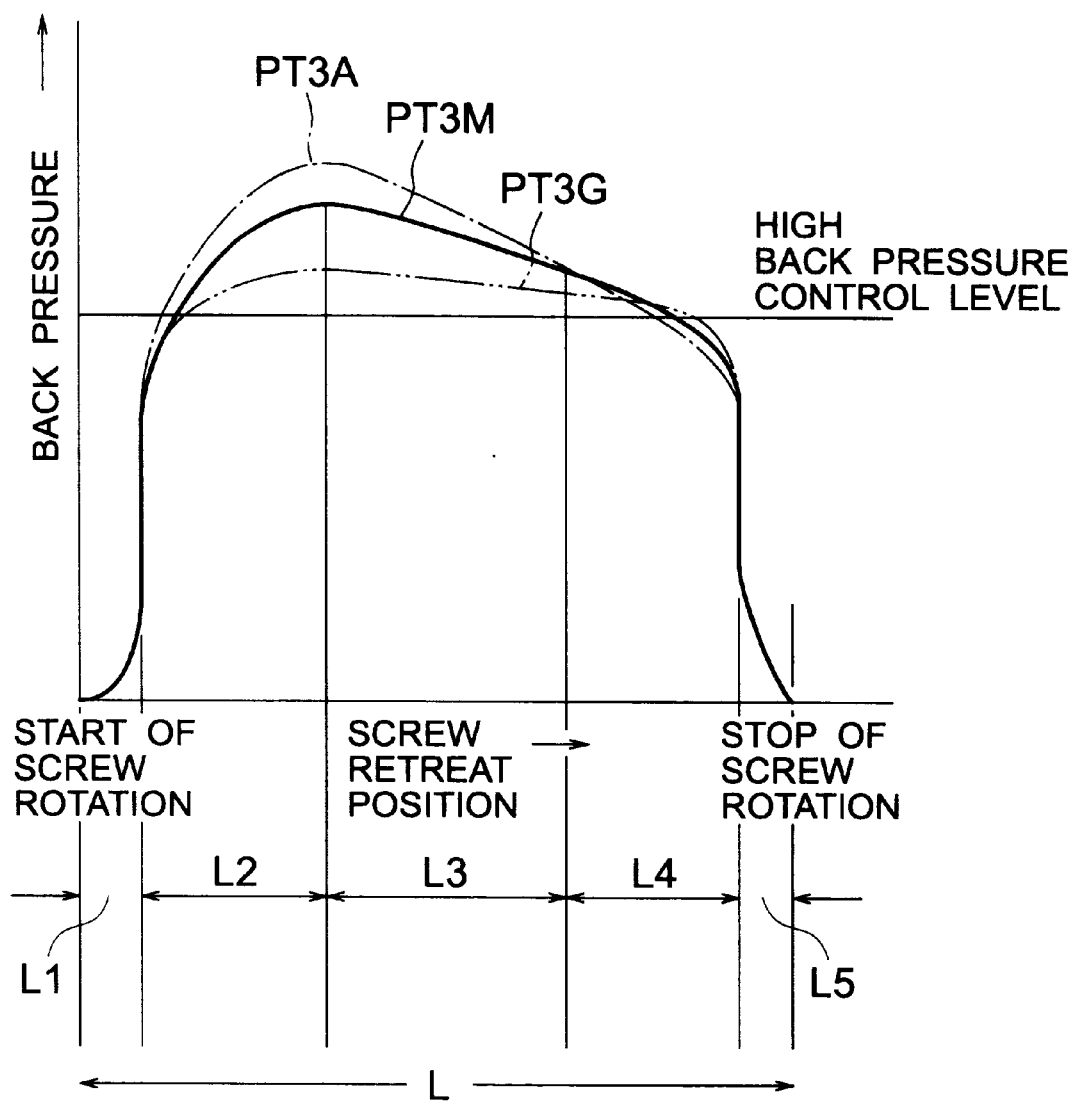
FIG. 11 is a view showing a relationship between a high back pressure control level and three third back pressure pattern for use in the back pressure control in the back pressure control apparatus illustrated in FIG. 8.

Referring to FIGS. 9, 10, and 11 in addition to FIG. 8, the description will proceed to back pressure patterns produced by the determining section 42A. In FIGS. 9 through 11, the abscissa and the ordinate represent the screw retreat position and the back pressure, respectively. FIG. 9 shows three first back pressure patterns: a first abrupt back pressure pattern PT1A; a first medium back pressure pattern PT1M; and a first gentle back pressure pattern PT1G when the back pressure control level set by the level setting section 41 is relatively low. FIG. 10 shows three second back pressure patterns: a second abrupt back pressure pattern PT2A; a second medium back pressure pattern PT2M; and a second gentle back pressure pattern PT2G when the back pressure control level set by the level setting section 41 is medium. FIG. 11 shows three third back pressure patterns: a third abrupt back pressure pattern PT3A; a third medium back pressure pattern PT3M; and a third gentle back pressure pattern PT3 when the back pressure control level set by the level setting section 41 is relatively high.

As shown in FIG. 9, the first medium back pressure pattern PT1M corresponds to the first back pressure pattern PT1 illustrated in FIG. 5. The first abrupt back pressure pattern PT1A has a maximum back pressure command value which is higher than that of the first medium back pressure pattern PT1M. The first gentle back pressure pattern PT1G has a maximum back pressure command value which is lower than that of the first medium back pressure pattern PT1M.

Likewise, the second medium back pressure pattern PT2M illustrated in FIG. 10 corresponds to the second back pressure pattern PT2 illustrated in FIG. 6. The second abrupt back pressure pattern PT2A has a maximum back pressure command value which is higher than that of the second medium back pressure pattern PT2M. The second gentle back pressure pattern PT2G has a maximum back pressure command value which is lower than that of the second medium back pressure pattern PT2M.

Similarly, the third medium back pressure pattern PT3M illustrated in FIG. 11 corresponds to the third back pressure pattern PT3 illustrated in FIG. 7. The third abrupt back pressure pattern PT3A has a maximum back pressure command value which is higher than that of the third medium back pressure pattern PT3M. The third gentle back pressure pattern PT3G has a maximum back pressure command value which is lower than that of the third medium back pressure pattern PT3M.

Each of the first through the third abrupt back pressure patterns PT1A, PT2A, and PT3A has the first mountain-shaped portion. Likewise, each of the first through the third medium back pressure pattern PT1M, PT2M, and PT3M has the second mountain-shaped portion. Similarly, each of the first through the third gentle back pressure pattern PT1G, PT2G, and PT3G has the third mountain-shaped portion.

For example, the sharpness selecting section 43 may select the first sharpness as the selected sharpness and the level setting section 41 sets a low back pressure control level. In this event, the determining section 42A produces or prepares the pattern signal indicative of the first abrupt back pressure pattern PT1A as illustrated in FIG. 9. As another example, the sharpness selecting section 43 may select the second sharpness as the selected sharpness and the level setting section 41 sets a medium back pressure control level. Under the circumstances, the determining section 42A produces or prepares the pattern signal indicative of the second medium back pressure pattern PT2M as illustrated in FIG. 10. As a further example, the sharpness selecting section 43 may select the third sharpness as the selected sharpness and the level setting section 41 sets a high back pressure control level. In this event, the determining section 42A produces or prepares the pattern signal indicative of the third gentle back pressure pattern PT3G as illustrated in FIG. 11.

As described above, the determining section 42A may produce or prepare the pattern signal indicative of the back pressure pattern having one selected from the first through the third mountain-shaped portions. This is because consideration should be given to a special characteristic of the resin to be molded.

Specifically, attention will be directed to resin such as polyamide where a racing phenomenon easily occurs in the screw 20. In this event, it is necessary for such resin to make the back pressure pattern abrupt, like in PT1A, PT2A, and PT3A, which has a relatively abrupt transition from the start low back pressure command value as it approaches the maximum back pressure command value at the leading divided stroke region L2 and which has an abrupt slope with the retreat of the screw 20 at the intermediate divided stroke region L3. Attention will be directed to resin such as acrylonitrile butadiene styrene resin (ABS), polycarbonate, olefinic resin such as polypropylene, polyethylene, and polystyrene. Under the circumstances, it is necessary for such resin to make the back pressure pattern gentle, like in PT1G, PT2G, and PT3G, which has a relatively gentle transition from the start low back pressure command value as it approaches the maximum back pressure command value at the leading divided stroke region L2 and which has a gentle slope with the retreat of the screw 20 at the intermediate divided stroke region L3. Attention will be directed to resin such as poly butylene terephthalate (PBT) resin. In this event, it is necessary for such resin to make the back pressure pattern medium, like in PT1M, PT2M, and PT3M, which has a medium transition from the start low back pressure command value as it approaches the maximum back pressure command value at the leading divided stroke region L2 and which has a medium slope with the retreat of the screw 20 at the intermediate divided stroke region L3.

Comparison will be made among the first abrupt back pressure pattern PT1A, the second medium back pressure pattern PT2M, and the third gentle back pressure pattern PT3G. The first abrupt back pressure pattern PT1A has the smallest peak value and the sharpest peak shape while the third gentle back pressure pattern PT3G has the largest peak value and the dullest peak shape. In addition, the second medium back pressure pattern PT2M has a middle peak value and a peak shape having an average sharpness.

Responsive to the back pressure control level set by the level setting section 41, the mountain-shaped portion of the back pressure pattern selected by the sharpness selecting section 43 shifts up and down along the ordinate. For this purpose, the determining section 42A includes a memory 421A for preliminarily storing the first through the third mountain-shaped portions of the back pressure pattern as three standard configurations.

Now, the description will proceed to operation of the back pressure control apparatus illustrated in FIG. 8. An operator first operates the level setting section 41 to make the level setting section 41 set the back pressure control level and operates the sharpness selecting section 43 to make the sharpness selecting section 43 select one of the first through the third sharpnesses as the selected sharpness in accordance with the resin to be molded. The level set signal indicative of the back pressure control level and the sharpness selected signal indicative of the selected sharpness are supplied to the determining section 42A. Responsive to the sharpness selected signal, the determining section 42A determines, on the basis of the back pressure control level, as a selected back pressure pattern, one of the back pressure patterns as illustrated in FIGS. 9 through 11 that has a selected mountain-shaped portion corresponding to the selected sharpness. The determining section 42A produces the pattern signal indicative of the selected back pressure pattern. The pattern signal is supplied to the controller 26. The controller 26 is also supplied with the screw position detected signal indicative of the screw retreat position from the screw position detector 27 through the amplifier 28 and with the pressure detected signal indicative of the back pressure detected value from the back pressure detector 18 through the amplifier 25. Responsive to the screw retreat position indicated by the screw position detected signal, the controller 26 carries out back pressure control so that the back pressure detected value coincides with the variable back pressure command value indicated by the selected back pressure pattern that corresponds to the screw retreat position. Specifically, the controller 26 recognizes a current screw retreat position from the screw position detected signal detected by the screw position detector 27 after the screw 20 begins to rotate. Subsequently, the controller 26 compares the back pressure detected value with a current back pressure command value in the pattern signal that corresponds to the current screw retreat position to obtain a current pressure difference between the back pressure detected value and the current back pressure command value. Thereafter, the controller 26 controls a current or an output torque of the injection servomotor 11 via the motor driver 30 so that the current pressure difference becomes zero or becomes approximately zero.

As is described in conjunction with FIG. 3, in the conventional back pressure control method, the operator must set three fixed back pressure command values: the first fixed back pressure command value P1 immediately after start of screw rotation in a plasticization and metering process, the third fixed back pressure command value P3 immediately before completion of the plasticization and metering process, and the second fixed back pressure command value P2 during a normal plasticization and metering process. Preferably, the operator must set four fixed back pressure control values as illustrated in a broken line of FIG. 3. In addition, as regards a combination of a plurality of fixed back pressure command values and switching positions therebetween, the operator is required to have experience as to how the retreat of the screw 20, namely, chewing and kneading goes smoothly.

In contrast to this, in the back pressure control apparatus according to the second embodiment of this invention, the operator may set only one back pressure control level by means of the level setting section 41 and may select one of the first through the third sharpnesses by means of the sharpness selecting section 43 and then the selected back pressure pattern is automatically determined or prepared by the determining section 42A. In this event, the operator may first set the back pressure control level rather low and subsequently may raise the back pressure control level in consideration of conditions of the retreat of the screw 20, states of gas discharged from the molten resin in the nose portion of the heating cylinder 21, or color of the molten resin. Such work is extremely easy in comparison with conventional setting work for the combination of the fixed back pressure command values and the switching positions therebetween and a high level of skill thereof is not necessary.

Incidentally, the back pressure pattern produced by the determining section 42A is displayed on a display screen of a display device (not shown). In this event, by means of a well-known arrangement such as a light pen, a sharpness of the back pressure pattern displayed on the display screen may be optionally modified.

Figure 12:
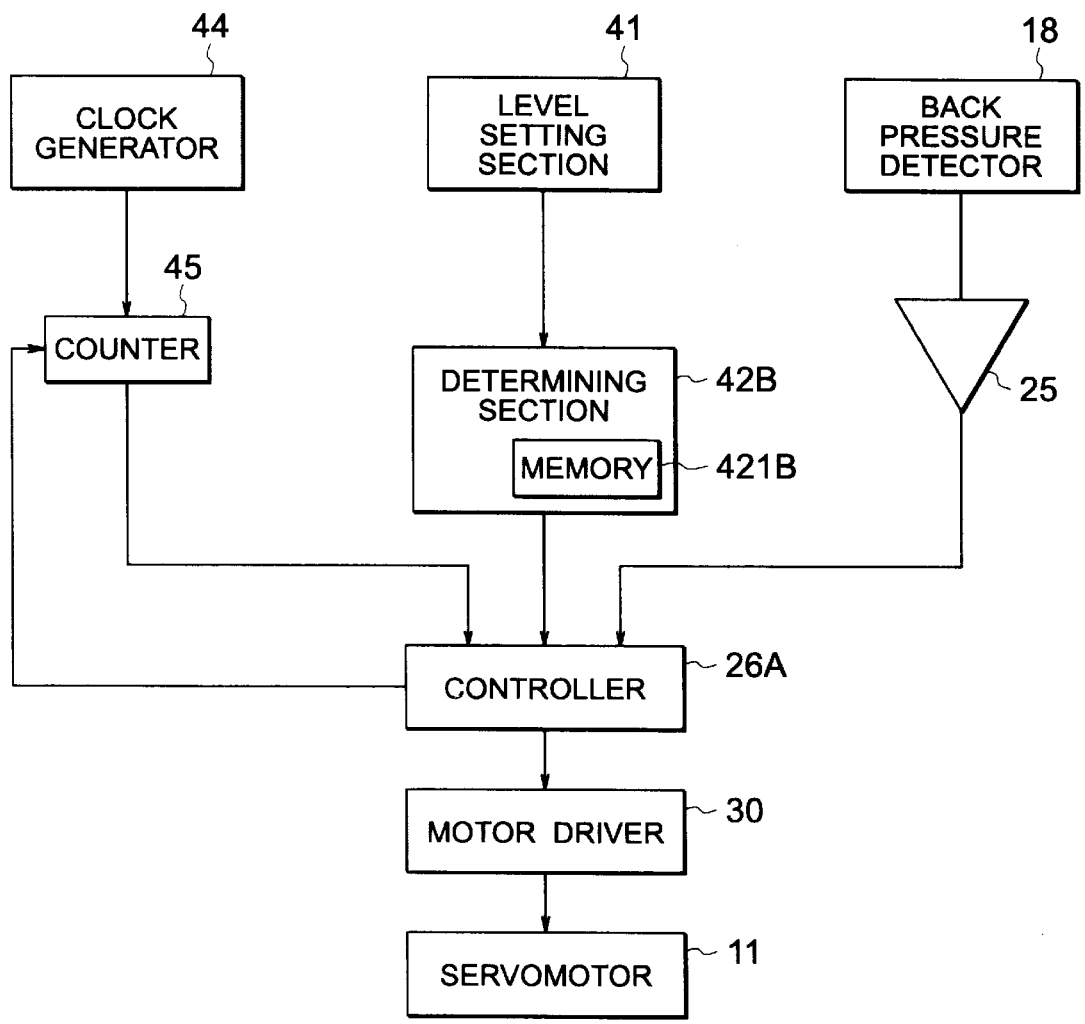
FIG. 12 is a block diagram of a back pressure control apparatus according to a third embodiment of this invention.

Referring to FIG. 12, the description will proceed to a back pressure control apparatus according to a third embodiment of this invention. The illustrated back pressure control apparatus is similar in structure and operation to that illustrated in FIG. 4 except for the back pressure control apparatus comprises a combination of a clock generator 44 and a counter 45 in lieu of a combination of the screw position detector 27 and the amplifier 28 and the determining section and the controller are modified from those illustrated in FIG. 4 as will later become clear. The determining section and the controller are therefore depicted at 42B and 26A.

The clock generator 44 generates a clock signal which is supplied to the counter 45. The counter 45 is reset or initialized to zero in response to a reset signal from the controller 26A. The reset signal is produced by controller 26A on the start of the screw rotation. The counter 45 carries out a counting operation in synchronism with the clock signal to produce a time instant signal indicative of a screw retreat time instant. That is, a combination of the clock generator 44 and the counter 45 serves as a screw retreat time instant generator for generating the time instant signal indicative of the screw retreat time instant. The time instant signal is supplied to the controller 26A.

Set by the level setting section 41, the level set signal indicative of the back pressure control level is supplied to the determining section 42B. In the manner which will become clear as the description proceeds, the determining section 42B determines, on the basis of the back pressure control level, a back pressure pattern having a variable back pressure command value which continuously changes with respect to time. The determining section 42B produces a pattern signal indicative of the back pressure pattern. The pattern signal is supplied to the controller 26A. At any rate, a combination of the level setting section 41 and the determining section 42B acts as a back pressure pattern preparing unit for preparing the back pressure pattern with respect to time.

The controller 26A is supplied with the back pressure detected signal indicative of the back pressure detected value from the back pressure detector 18 through the amplifier 25. Responsive to the back pressure detected signal and the time instant signal, the controller 26A carries out back pressure control in accordance with the pattern signal by means of controlling the injection servomotor 11 via the motor driver 30.

Figure 13:
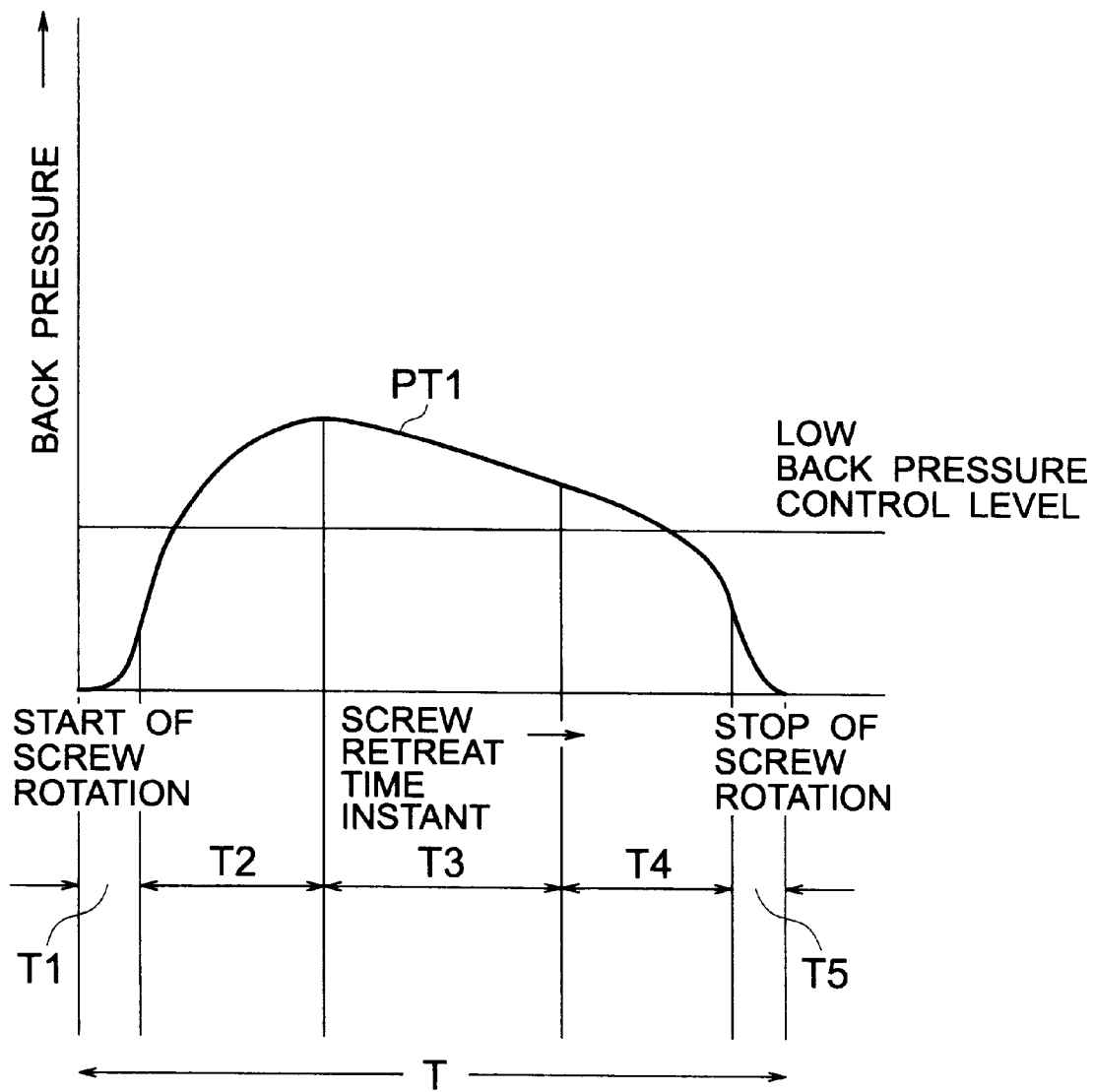
FIG. 13 is a view showing a relationship between a low back pressure control level and a first back pressure pattern for use in the back pressure control in the back pressure control apparatus illustrated in FIG. 12.
Figure 14:
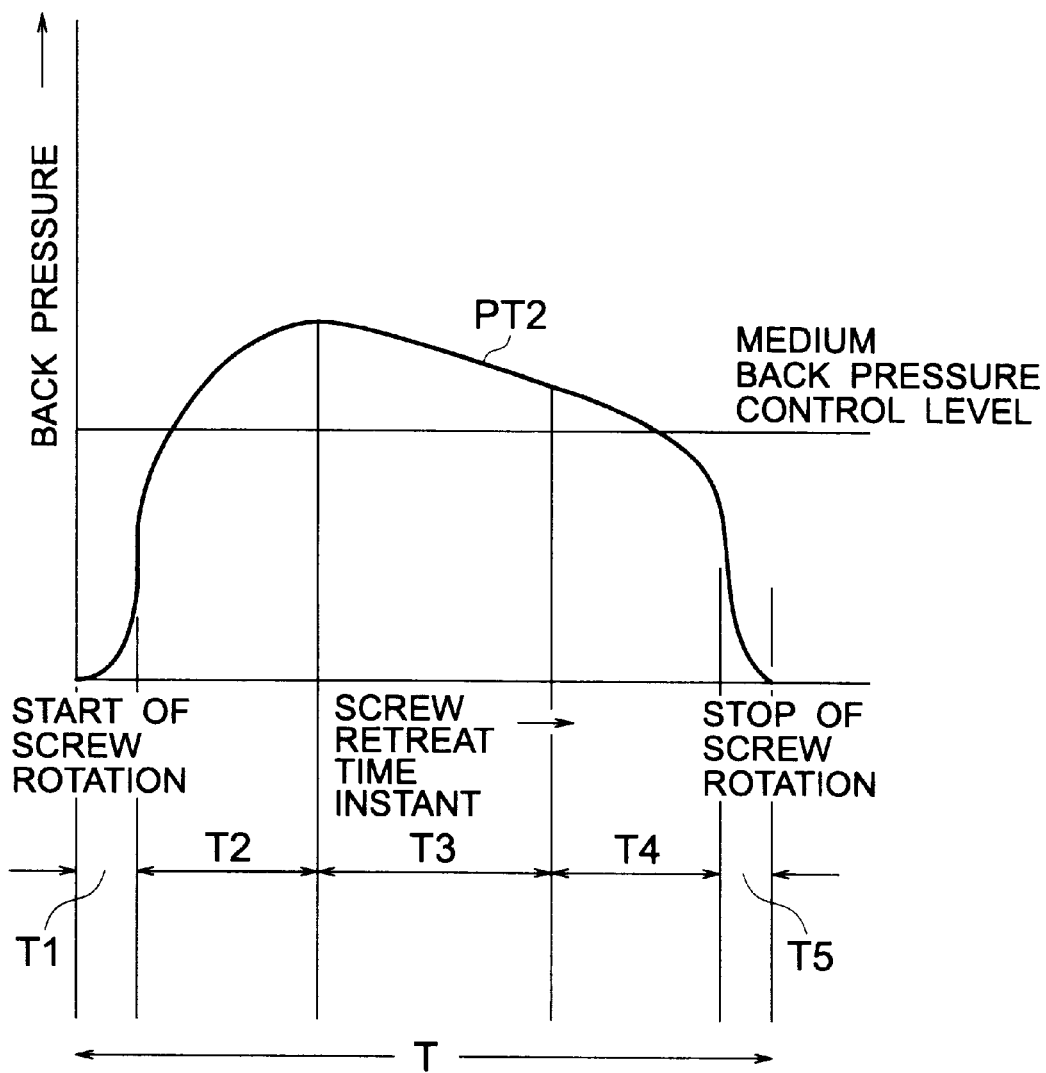
FIG. 14 is a view showing a relationship between a medium back pressure control level and a second back pressure pattern for use in the back pressure control in the back pressure control apparatus illustrated in FIG. 12.
Figure 15:
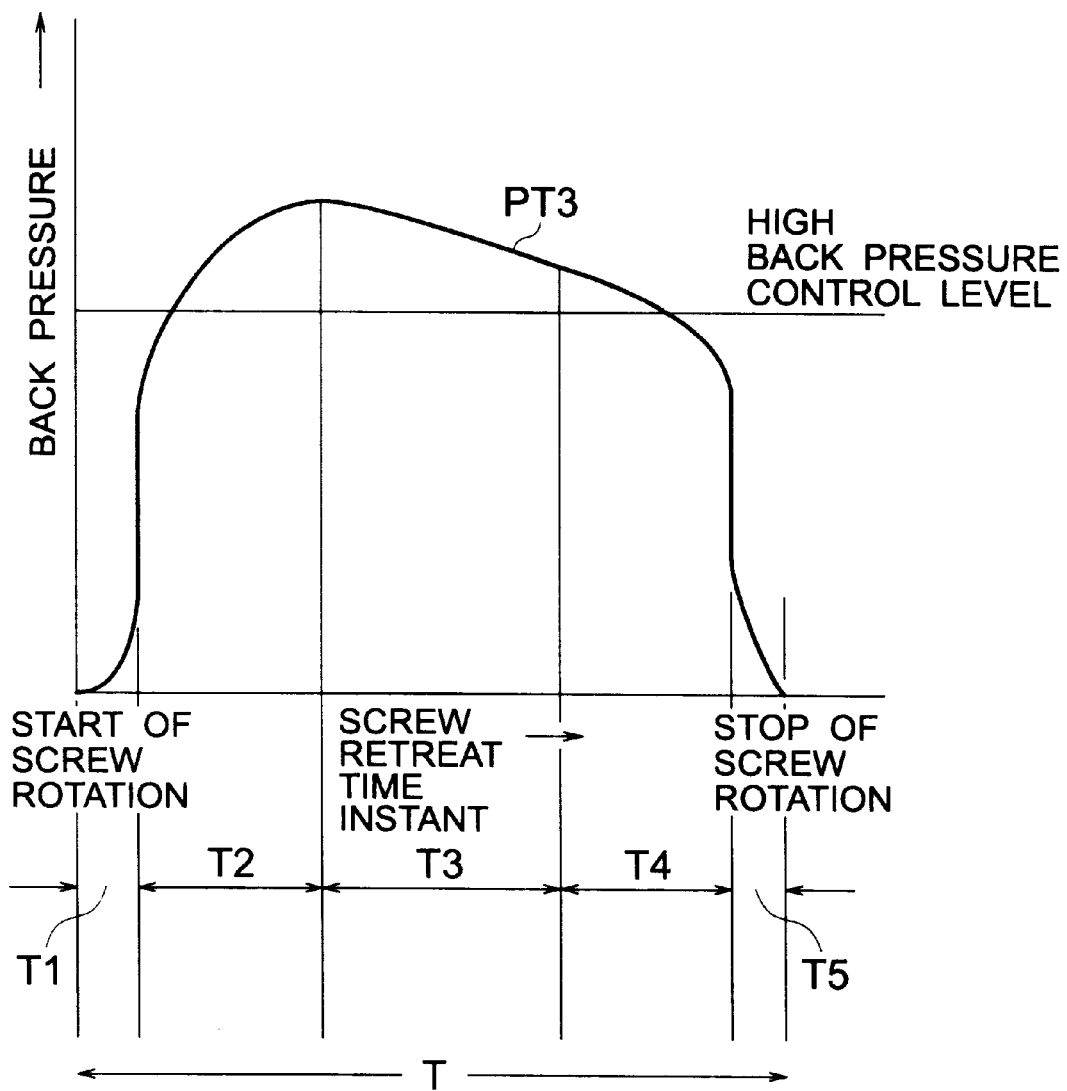
FIG. 15 is a view showing a relationship between a high back pressure control level and a third back pressure pattern for use in the back pressure control in the back pressure control apparatus illustrated in FIG. 12.

Referring to FIGS. 13, 14, and 15 in addition to FIG. 12, the description will proceed to back pressure patterns produced by the determining section 42B. In FIGS. 13 through 15, the abscissa and the ordinate represent the screw retreat time instant and the back pressure, respectively. FIG. 13 shows a first back pressure pattern PT1 when the back pressure control level set by the level setting section 41 is low. FIG. 14 shows a second back pressure pattern PT2 when the back pressure control level set by the level setting section 41 is medium. FIG. 15 shows a third back pressure pattern PT3 when the back pressure control level set by the level setting section 41 is high.

In FIGS. 13 through 15, each of the first through the third back pressure patterns PT1, PT2, and PT3 is defined by the screw retreat time instant between the start of the screw rotation and the stop of the screw rotation. Specifically, between the screw retreat time instant corresponding to the start of the screw rotation and the screw retreat time instant corresponding to the stop of the screw rotation, a screw movement time interval is represented by T. The screw movement time interval T is divided into a plurality of divided time durations as a unit of T/10 which is one-tenth as large as the screw movement time interval T.

In the example being illustrated, the screw movement time interval T is divided into first through fifth divided time durations T1, T2, T3, T4, and T5 in the order in which the screw retreat time instant is shifted from a start time instant for the start of the screw rotation to a stop time instant for the stop of the screw rotation. Each of the first and the fifth divided time durations T1 and T5 has a time interval T/10 which is one-tenths as large as the screw movement time interval L. The first divided time duration T1 is called a start divided time duration while the fifth divided time duration T5 is called a final divided time duration. Each of the second and the fourth divided time durations T2 and T4 has a time interval 2T/10 which is two-tenths as large as the screw movement time interval L. The second divided time duration T2 is referred to as a leading divided time duration while the fourth divided time duration T4 is referred to as a trailing divided time duration. The third divided time duration T3 has a time interval 4L/10 which is four-tenths as large as the screw movement time interval T. The third divided time duration T3 is called an intermediate divided time duration.

As illustrated in FIGS. 13 through 15, at the first or the start divided time duration T1 immediately after the start of the screw rotation, each of the first through the third back pressure patterns PT1, PT2, and PT3 has a variable back pressure command value which shifts from a zero back pressure command value to a start low back pressure command value. At the second or the leading divided time duration T2, each of the first through the third back pressure patterns PT1, PT2, and PT3 has a variable back pressure command value which rises from the start low back pressure command value up to a maximum back pressure command value. At the third or the intermediate divided time duration T3, each of the first through the third back pressure patterns PT1, PT2, and PT3 has a variable back pressure command value which gently falls from the maximum back pressure commend value to a medium back pressure command value. At the fourth or the trailing divided time duration T4, each of the first through the third back pressure patterns PT1, PT2, and PT3 has a variable back pressure command value which relatively abruptly falls from the medium back pressure command value to a final low back pressure command value. At the fifth or the final divided time duration T5, each of the first through the third back pressure patterns PT1, PT2, and PT3 has a variable back pressure command value which shifts from the final low back pressure command value to a zero back pressure command value.

As a result, it is possible to obtain the back pressure pattern having the variable back pressure command value which continuously changes with the back pressure command value related to the screw retreat time instant with a one-to-one correspondence.

As shown in FIGS. 13 through 15, each of the first through the third back pressure patterns PT1, PT2, and PT3 has a mountain-shaped portion except for portions corresponding to the first and the final divided time durations T1 and T5. Responsive to the back pressure control level set by the level setting section 41, the mountain-shaped portion of the back pressure pattern shifts up and down along the ordinate. For this purpose, the determining section 42B includes a memory 421B for preliminarily storing the mountain-shaped portion of the back pressure pattern as a standard configuration.

Now, the description will proceed to operation of the back pressure control apparatus illustrated in FIG. 12. An operator first operates the level setting section 41 to make the level setting section 41 set the back pressure control level. The level set signal indicative of the back pressure control level is supplied to the determining section 42B. Responsive to the level set signal, the determining section 42B determines, on the basis of the back pressure control level, the back pressure pattern as illustrated in FIGS. 13 through 15 to produce the pattern signal indicative of the back pressure pattern. The controller 26A is also supplied with the time instant signal indicative of the screw retreat time instant from the counter 45 and with the pressure detected signal indicative of the back pressure detected value from the back pressure detector 18 through the amplifier 25. Responsive to the screw retreat time instant indicated by the time instant signal, the controller 26A carries out back pressure control so that the back pressure detected value coincides with the variable back pressure command value indicated by the back pressure pattern that corresponds to the screw retreat time instant.

Specifically, the controller 26A recognizes a current screw retreat time instant from the time instant signal produced by the counter 45 after the screw 20 begins to rotate. Subsequently, the controller 26A compares the back pressure detected value with a current back pressure command value in the pattern signal that corresponds to the current screw retreat time instant to obtain a current pressure difference between the back pressure detected value and the current back pressure command value. Thereafter, the controller 26A controls a current or an output torque of the injection servomotor 11 via the motor driver 30 so that the current pressure difference becomes zero or becomes approximately zero.

In addition, as described above, the back pressure pattern has the final low back pressure command value at the fifth or the final divided time duration T5. As a result, although the rotation speed of the screw 20 decreases at the fifth or the final divided time duration T5, the screw retreat is not changeable and the screw 20 does not race at this position. Although the first through the fifth divided time durations T1 to T5 have time intervals which are one-tenths, two-tenths, four-tenths, two-tenths, and one-tenths as large as the screw movement time interval T, respectively, in the above-mentioned embodiment, each of the first through the fifth divided time durations T1 to T5 may have a time interval which is suitably selected.

As is described in conjunction with FIG. 3, in the conventional back pressure control method, the operator must set three fixed back pressure command values: the first fixed back pressure command value P1 immediately after start of screw rotation in a plasticization and metering process, the third fixed back pressure command value P3 immediately before completion of the plasticization and metering process, and the second fixed back pressure command value P2 during a normal plasticization and metering process. Preferably, the operator must set four fixed back pressure control values as illustrated in a broken line of FIG. 3. In addition, as regards a combination of a plurality of fixed back pressure command values and switching positions therebetween, the operator is required to have experience as to how the retreat of the screw 20, namely, chewing and kneading goes smoothly.

In contrast to this, in the back pressure control apparatus according to the third embodiment of this invention, the operator may set only one back pressure control level by means of the level setting section 41 and then the back pressure pattern is automatically calculated or prepared by the determining section 42B. In this event, the operator may first set the back pressure control level rather low and subsequently may rise the back pressure control level in consideration of conditions of the retreat of the screw 20, states of gas discharged from the molten resin in the nose portion of the heating cylinder 21, or color of the molten resin. Such work is extremely easy in comparison with conventional setting work for the combination of the fixed back pressure command values and the switching positions therebetween and a high level of skill thereof is not necessary.

The back pressure control apparatus illustrated in FIG. 12 prepares or produces the back pressure pattern having only one mountain-shaped portion. That is, the back pressure pattern has only one type of mountain-shaped portion. However, the back pressure control apparatus preferably may prepare or produce the back pressure pattern having one selected from a plurality of mountain-shaped portions in the manner which will presently be described. In other words, the back pressure pattern may have two or more types of mountain-shaped portions.

Figure 16:
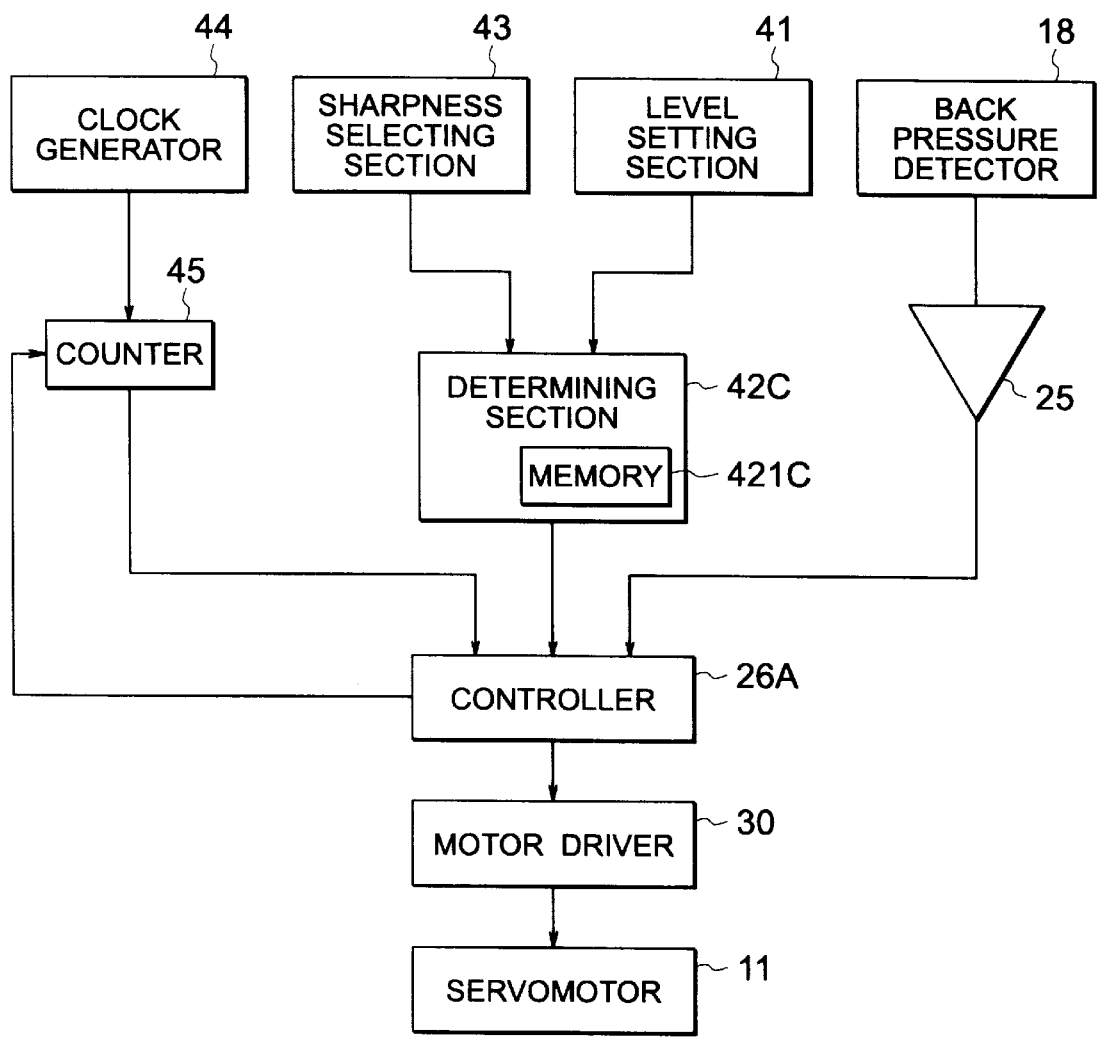
FIG. 16 is a block diagram of a back pressure control apparatus according to a fourth embodiment of this invention.

Referring to FIG. 16, the description will proceed to a back pressure control apparatus according to a fourth embodiment of this invention. The illustrated back pressure control apparatus is similar in structure and operation to that illustrated in FIG. 12 except that the back pressure control apparatus further comprises the sharpness selecting section 43 and the determining section is modified from that illustrated in FIG. 12 as will later become clear. The determining section is therefore depicted at 42C.

Responsive to the sharpness selected signal supplied from the sharpness selecting section 43, the determining section 42C determines, on the basis of the back pressure control level, a back pressure pattern having a variable back pressure command value which continuously changes with respect to the screw retreat time instant in the manner which will become clear as the description proceeds. The determining section 42C produces a pattern signal indicative of the back pressure pattern. The pattern signal is supplied to the controller 26A. At any rate, a combination of the level setting section 41, the sharpness selecting section 43, and the determining section 42C serves as a back pressure pattern preparing unit for preparing the back pressure pattern with respect to time.

Responsive to the back pressure detected signal and the time instant signal, the controller 26A carries out back pressure control in accordance with the pattern signal by means of controlling the injection servomotor 11 via the motor driver 30.

Figure 17:
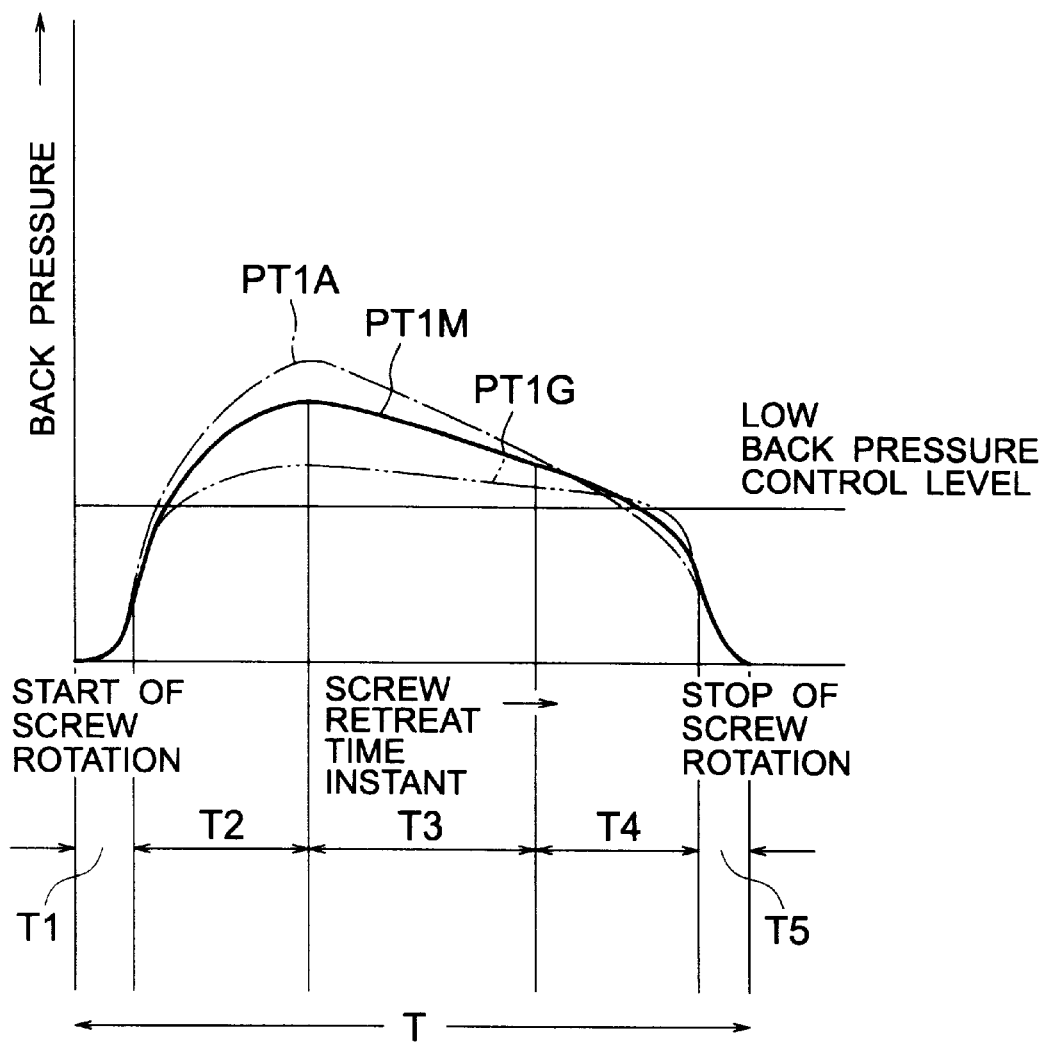
FIG. 17 is a view showing a relationship between a low back pressure control level and three first back pressure pattern for use in the back pressure control in the back pressure control apparatus illustrated in FIG. 16.
Figure 18:
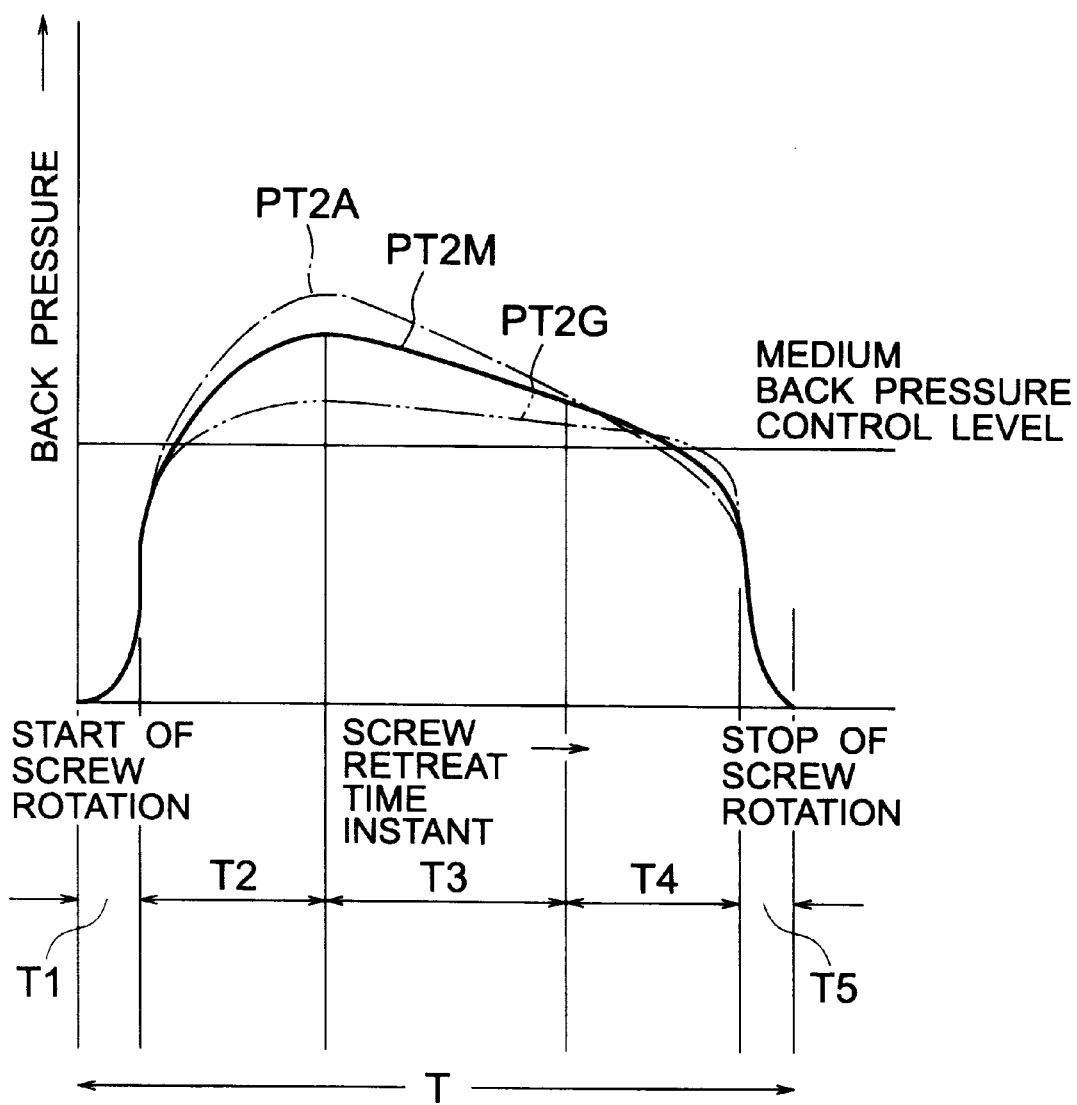
FIG. 18 is a view showing a relationship between a medium back pressure control level and three second back pressure pattern for use in the back pressure control in the back pressure control apparatus illustrated in FIG. 16.
Figure 19:
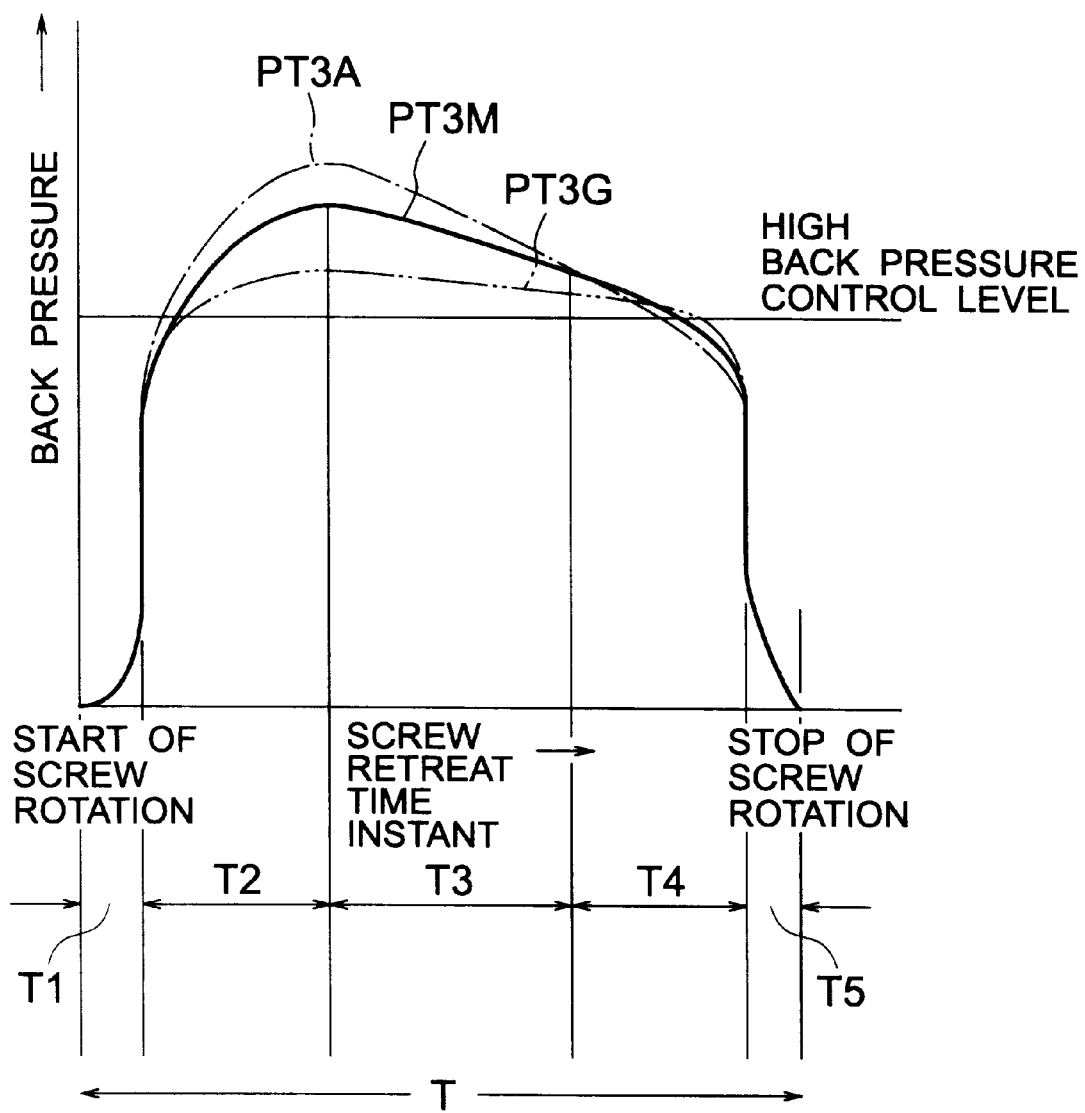
FIG. 19 is a view showing a relationship between a high back pressure control level and three third back pressure pattern for use in the back pressure control in the back pressure control apparatus illustrated in FIG. 16.

Referring to FIGS. 17, 18, and 19 in addition to FIG. 16, the description will proceed to back pressure patterns produced by the determining section 42C. In FIGS. 17 through 19, the abscissa and the ordinate represent the screw retreat position and the back pressure, respectively. FIG. 17 shows three first back pressure patterns: a first abrupt back pressure pattern PT1A; a first medium back pressure pattern PT1M; and a first gentle back pressure pattern PT1G when the back pressure control level set by the level setting section 41 is relatively low. FIG. 18 shows three second back pressure patterns: a second abrupt back pressure pattern PT2A; a second medium back pressure pattern PT2M; and a second gentle back pressure pattern PT2G when the back pressure control level set by the level setting section 41 is medium. FIG. 19 shows three third back pressure patterns: a third abrupt back pressure pattern PT3A; a third medium back pressure pattern PT3M; and a third gentle back pressure pattern PT3 when the back pressure control level set by the level setting section 41 is relatively high.

As shown in FIG. 17, the first medium back pressure pattern PT1M corresponds to the first back pressure pattern PT1 illustrated in FIG. 13. The first abrupt back pressure pattern PT1A has a maximum back pressure command value which is higher than that of the first medium back pressure pattern PT1M. The first gentle back pressure pattern PT1G has a maximum back pressure command value which is lower than that of the first medium back pressure pattern PT1M.

Likewise, the second medium back pressure pattern PT2M illustrated in FIG. 18 corresponds to the second back pressure pattern PT2 illustrated in FIG. 14. The second abrupt back pressure pattern PT2A has a maximum back pressure command value which is higher than that of the second medium back pressure pattern PT2M. The second gentle back pressure pattern PT2G has a maximum back pressure command value which is lower than that of the second medium back pressure pattern PT2M.

Similarly, the third medium back pressure pattern PT3M illustrated in FIG. 19 corresponds to the third back pressure pattern PT3 illustrated in FIG. 15. The third abrupt back pressure pattern PT3A has a maximum back pressure command value which is higher than that of the third medium back pressure pattern PT3M. The third gentle back pressure pattern PT3G has a maximum back pressure command value which is lower than that of the third medium back pressure pattern PT3M.

Each of the first through the third abrupt back pressure pattern PT1A, PT2A, and PT3A has the first mountain-shaped portion. Likewise, each of the first through the third medium back pressure pattern PT1M, PT2M, and PT3M has the second mountain-shaped portion. Similarly, each of the first through the third gentle back pressure pattern PT1G, PT2G, and PT3G has the third mountain-shaped portion.

It will be assumed that the sharpness selecting section 43 selects the first sharpness as the selected sharpness and the level setting section 41 sets a low back pressure control level. In this event, the determining section 42C produces or prepares the pattern signal indicative of the first abrupt back pressure pattern PT1A as illustrated in FIG. 17. It will be presumed that the sharpness selecting section 43 selects the second sharpness as the selected sharpness and the level setting section 41 sets a medium back pressure control level. Under the circumstances, the determining section 42C produces or prepares the pattern signal indicative of the second medium back pressure pattern PT2M as illustrated in FIG. 18. It will be assumed that the sharpness selecting section 43 selects the third sharpness as the selected sharpness and the level setting section 41 sets a high back pressure control level. In this event, the determining section 42C produces or prepares the pattern signal indicative of the third gentle back pressure pattern PT3G as illustrated in FIG. 19.

As described above, the determining section 42C may produce or prepare the pattern signal indicative of the back pressure pattern having one selected from the first through the third mountain-shaped portions. This is because consideration should be given to a special characteristic of the molten resin to be molded.

Specifically, attention will be directed to resin such as polyamide where a racing phenomenon easily occurs in the screw 20. In this event, it is necessary for such resin to make the back pressure pattern abrupt, like in PT1A, PT2A, and PT3A, which has a relatively abrupt transition from the start low back pressure command value as it approaches the maximum back pressure command value at the leading divided time duration T2 and which has an abrupt slope with the retreat of the screw 20 at the intermediate divided time duration T3. Attention will be directed to resin such as acrylonitrile butadiene styrene resin (ABS), polycarbonate, olefinic resin such as polypropylene, polyethylene, and polystyrene. Under the circumstances, it is necessary for such resin to make the back pressure pattern gentle, like in PT1G, PT2G, and PT3G, which has a relatively gentle transition from the start low back pressure command value as it approaches the maximum back pressure command value at the leading divided time duration T2 and which has a gentle slope with the retreat of the screw 20 at the intermediate divided time duration T3. Attention will be directed to resin such as poly butylene terephthalate (PBT) resin. In this event, it is necessary for such resin to make the back pressure pattern medium, like in PT1M, PT2M, and PT3M, which has a medium transition from the start low back pressure command value as it approaches the maximum back pressure command value at the leading divided time duration T2 and which has a medium slope with the retreat of the screw 20 at the intermediate divided time duration T3.

Responsive to the back pressure control level set by the level setting section 41, the mountain-shaped portion of the back pressure pattern selected by the sharpness selecting section 43 shifts up and down along the ordinate. For this purpose, the determining section 42C includes a memory 421C for preliminarily storing the first through the third mountain-shaped portions of the back pressure pattern as three standard configurations.

Now, the description will proceed to operation of the back pressure control apparatus illustrated in FIG. 16. An operator first operates the level setting section 41 to make the level setting section 41 set the back pressure control level and operates the sharpness selecting section 43 to make the sharpness selecting section 43 select one of the first through the third sharpnesses as the selected sharpness in accordance with the resin to be molded. The level set signal indicative of the back pressure control level and the sharpness selected signal indicative of the selected sharpness are supplied to the determining section 42C. Responsive to the sharpness selected signal, the determining section 42C determines, on the basis of the back pressure control level, as a selected pressure pattern, one of the back pressure patterns as illustrated in FIGS. 17 through 19 that has a selected mountain-shaped portion corresponding to the selected sharpness. The determining section 42C produces the pattern signal indicative of the selected back pressure patterns. The pattern signal is supplied to the controller 26A. The controller 26A is also supplied with the time instant signal indicative of the screw retreat time instant from the counter 45 and with the pressure detected signal indicative of the back pressure detected value from the back pressure detector 18 through the amplifier 25. Responsive to the screw retreat time instant indicated by the time instant signal, the controller 26A carries out back pressure control so that the back pressure detected value coincides with the variable back pressure command value indicated by the selected back pressure pattern that corresponds to the screw retreat time instant. Specifically, the controller 26A recognizes a current screw retreat time instant from the time instant signal produced by the counter 45 after the screw 20 begins to rotate. Subsequently, the controller 26A compares the back pressure detected value with a current back pressure command value in the pattern signal that corresponds to the current screw retreat time instant to obtain a current pressure difference between the back pressure detected value and the current back pressure command value. Thereafter, the controller 26A controls a current or an output torque of the injection servomotor 11 via the motor driver 30 so that the current pressure difference becomes zero or becomes approximately zero.

As is described in conjunction with FIG. 3, in the conventional back pressure control method, the operator must set three fixed back pressure command values: the first fixed back pressure command value P1 immediately after start of screw rotation in a plasticization and metering process, the third fixed back pressure command value P3 immediately before completion of the plasticization and metering process, and the second fixed back pressure command value P2 during a normal plasticization and metering process. Preferably, the operator must set four fixed back pressure control values as illustrated in a broken line of FIG. 3. In addition, as regards a combination of a plurality of fixed back pressure command values and switching positions therebetween, the operator is required to have experience as to how the retreat of the screw 20, namely, chewing and kneading goes smoothly.

In contrast to this, in the back pressure control apparatus according to the fourth embodiment of this invention, the operator may set only one back pressure control level by means of the level setting section 41 and may select one of the first through the third sharpnesses by means of the sharpness selecting section 43 and then the selected back pressure pattern is automatically determined or prepared by the determining section 42C. In this event, the operator may first set the back pressure control level rather low and subsequently may raise the back pressure control level in consideration of conditions of the retreat of the screw 20, states of gas discharged from the molten resin in the nose portion of the heating cylinder 21, or color of the molten resin. Such work is extremely easy in comparison with conventional setting work for the combination of the fixed back pressure command values and the switching positions therebetween and skill thereof is not necessary.

Incidentally, the back pressure pattern produced by the determining section 42C is displayed on a display screen of a display device (not shown). In this event, by means of a well-known arrangement such as a light pen, a sharpness of the back pressure pattern displayed on the display screen may be optionally modified.

While this invention has thus far been described in conjunction with preferred embodiments thereof, it will now be readily possible for those skilled in the art to put this invention into various other manners. Although the description is made as regards in a case of the motor-driven injection molding machine, the present invention may be applicable to a hydraulic injection molding machine as illustrated in FIG. 20.

Figure 20:
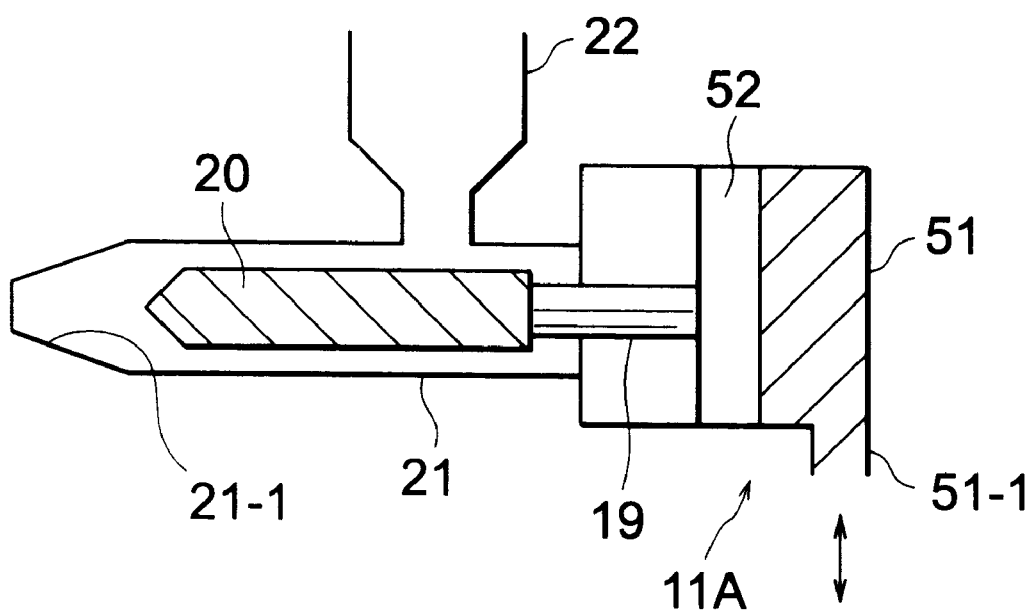
FIG. 20 is a schematic view of a conventional hydraulic injection molding machine which comprises an injection device driven by a hydraulic actuator.

As shown in FIG. 20, the hydraulic injection molding machine comprises a hydraulic actuator 11A in place of the servomotor 11 as illustrated in FIG. 1. The hydraulic actuator 11A comprises an injection cylinder 51 and a piston 52. Driving oil having a controlled flow speed or a controlled pressure flows into and flows out from the injection cylinder 51 through an inlet/outlet port 51-1. The hydraulic pressure of the injection cylinder 51 is controlled by a pressure control valve which will presently be described.

Figure 21:
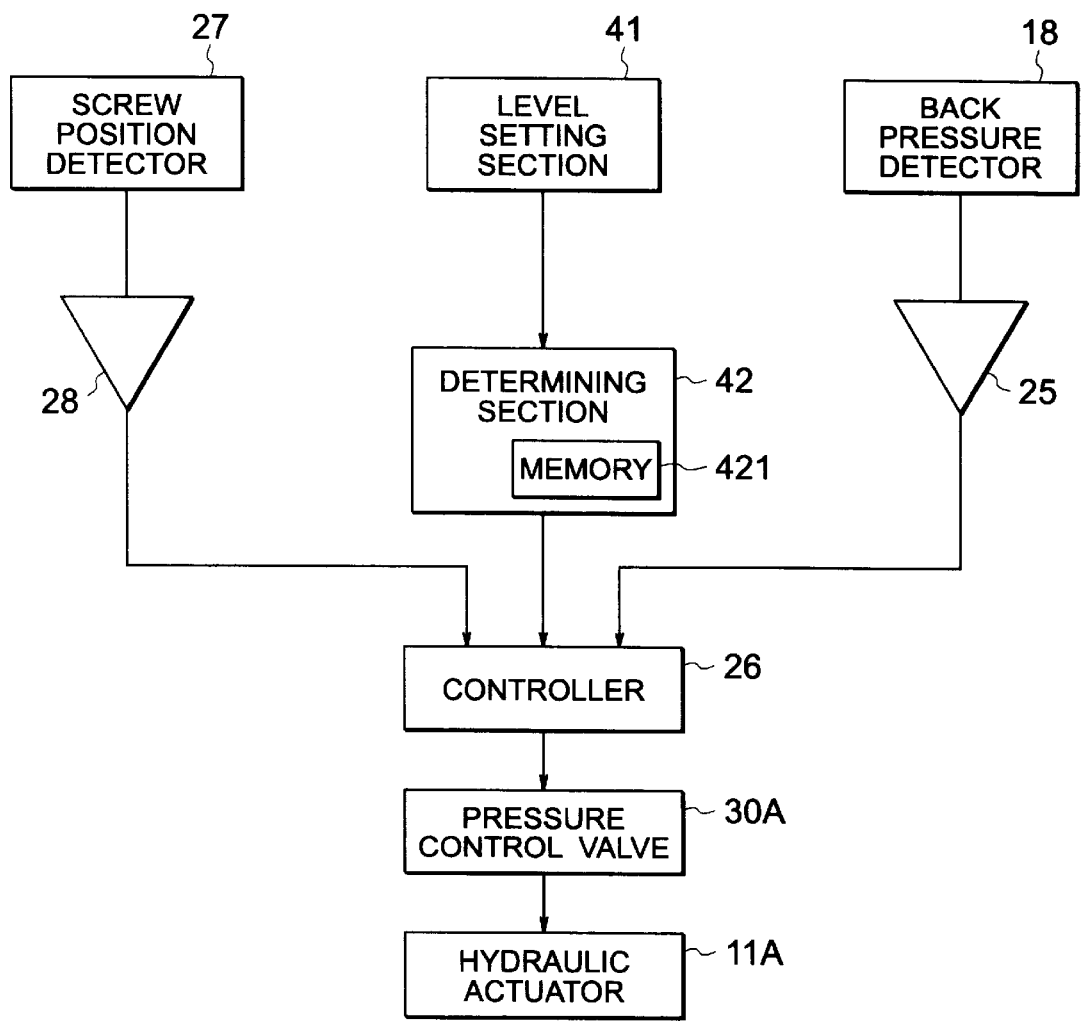
FIG. 21 is a block diagram of a back pressure control apparatus according to a fifth embodiment of this invention.

FIG. 21 illustrates a back pressure control apparatus according to a fifth embodiment of this invention in a case where the back pressure control apparatus is applicable to the hydraulic injection molding machine. The illustrated back pressure control apparatus is similar in structure and operation to that illustrated in FIG. 4 except that the back pressure control apparatus comprises a combination of the hydraulic actuator 11A and the pressure control valve depicted ad 30A in lieu of a combination of the servomotor 11 and the motor driver 30 illustrated in FIG. 4.

Figure 22:
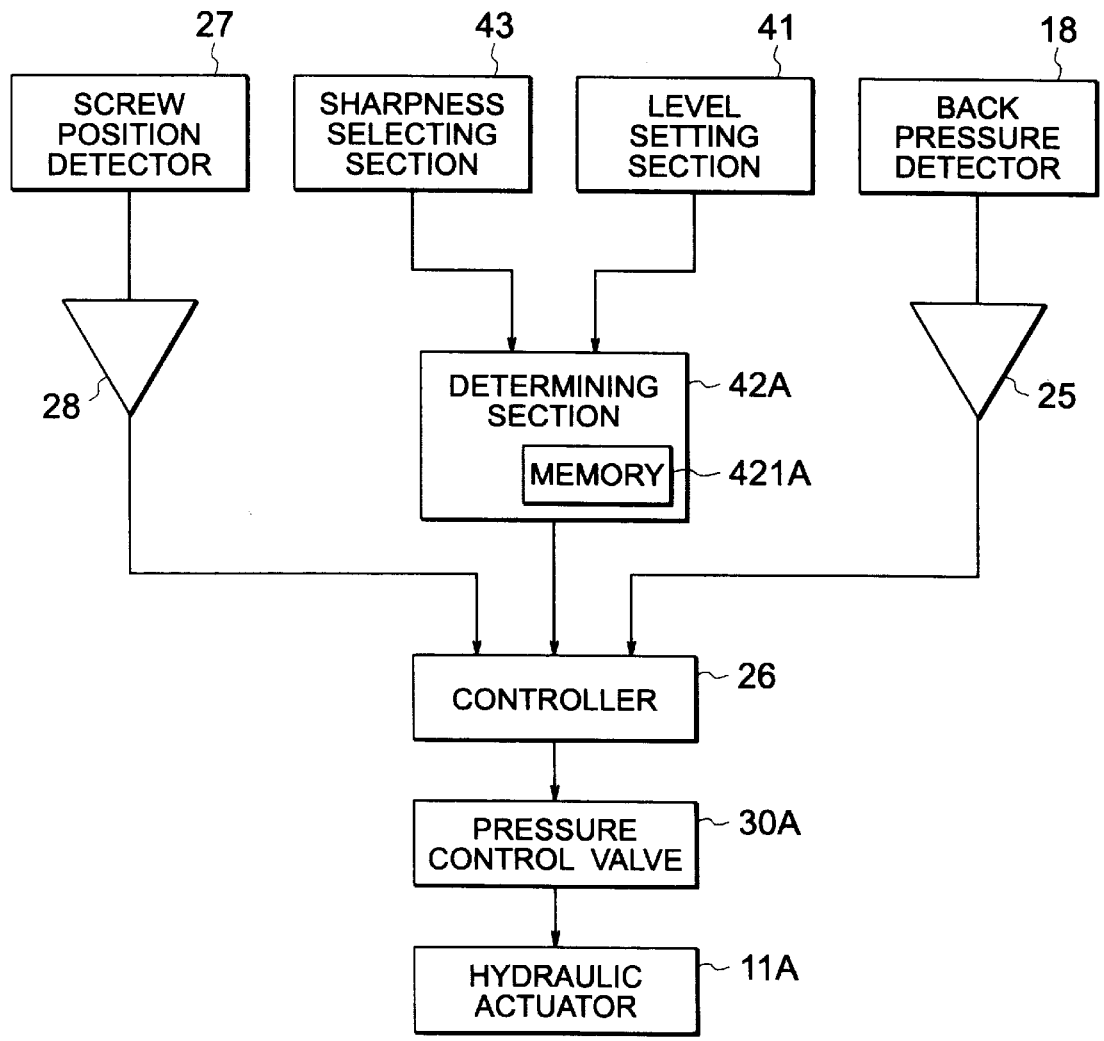
FIG. 22 is a block diagram of a back pressure control apparatus according to a sixth embodiment of this invention.

FIG. 22 illustrates a back pressure control apparatus according to a sixth embodiment of this invention in a case where the back pressure control apparatus is applicable to the hydraulic injection molding machine. The illustrated back pressure control apparatus is similar in structure and operation to that illustrated in FIG. 8 except that the back pressure control apparatus comprises a combination of the hydraulic actuator 11A and the pressure control valve 30A in place of a combination of the servomotor 11 and the motor driver 30 illustrated in FIG. 8.

Figure 23:
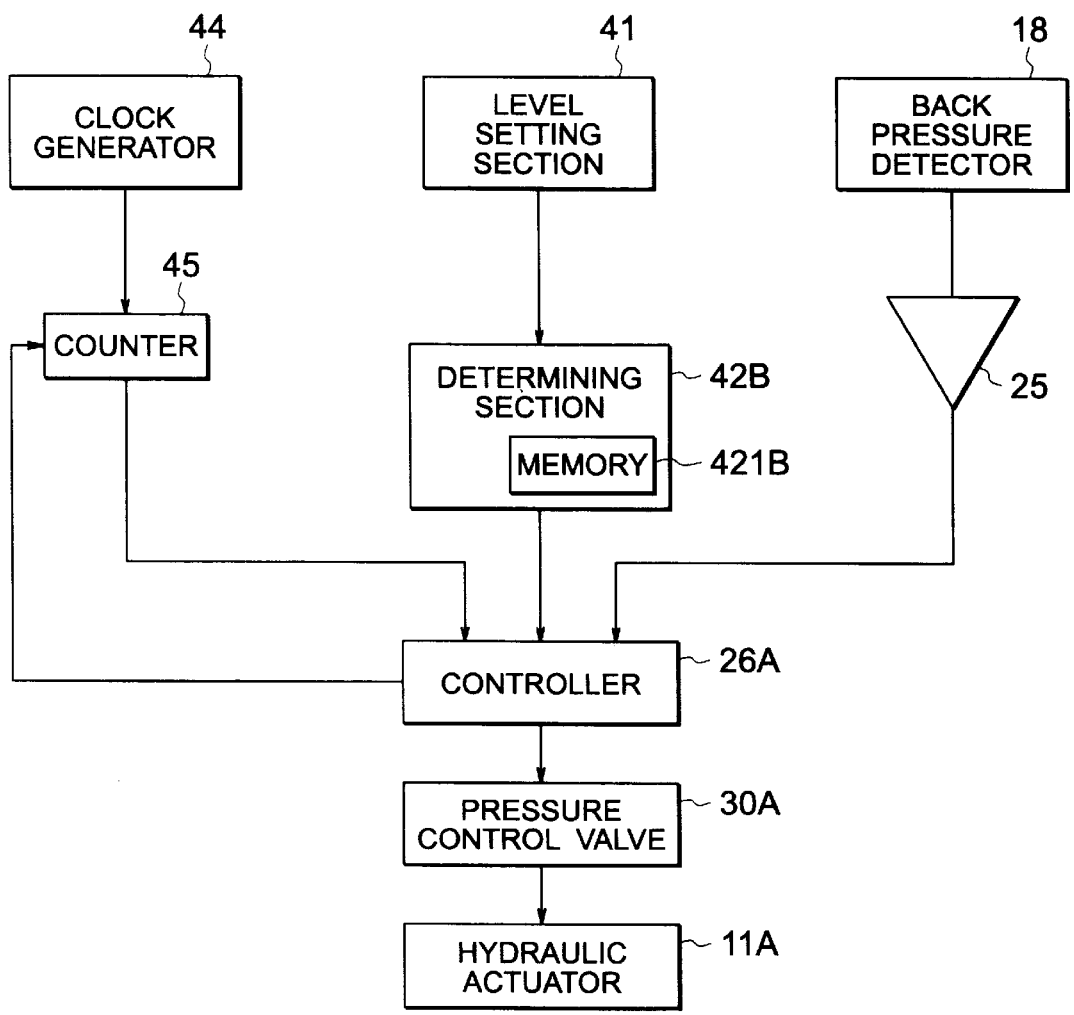
FIG. 23 is a block diagram of a back pressure control apparatus according to a seventh embodiment of this invention.

FIG. 23 illustrates a back pressure control apparatus according to a seventh embodiment of this invention in a case where the back pressure control apparatus is applicable to the hydraulic injection molding machine. The illustrated back pressure control apparatus is similar in structure and operation to that illustrated in FIG. 12 except that the back pressure control apparatus comprises a combination of the hydraulic actuator 11A and the pressure control valve 30A instead of a combination of the servomotor 11 and the motor driver 30 illustrated in FIG. 12.

Figure 24:
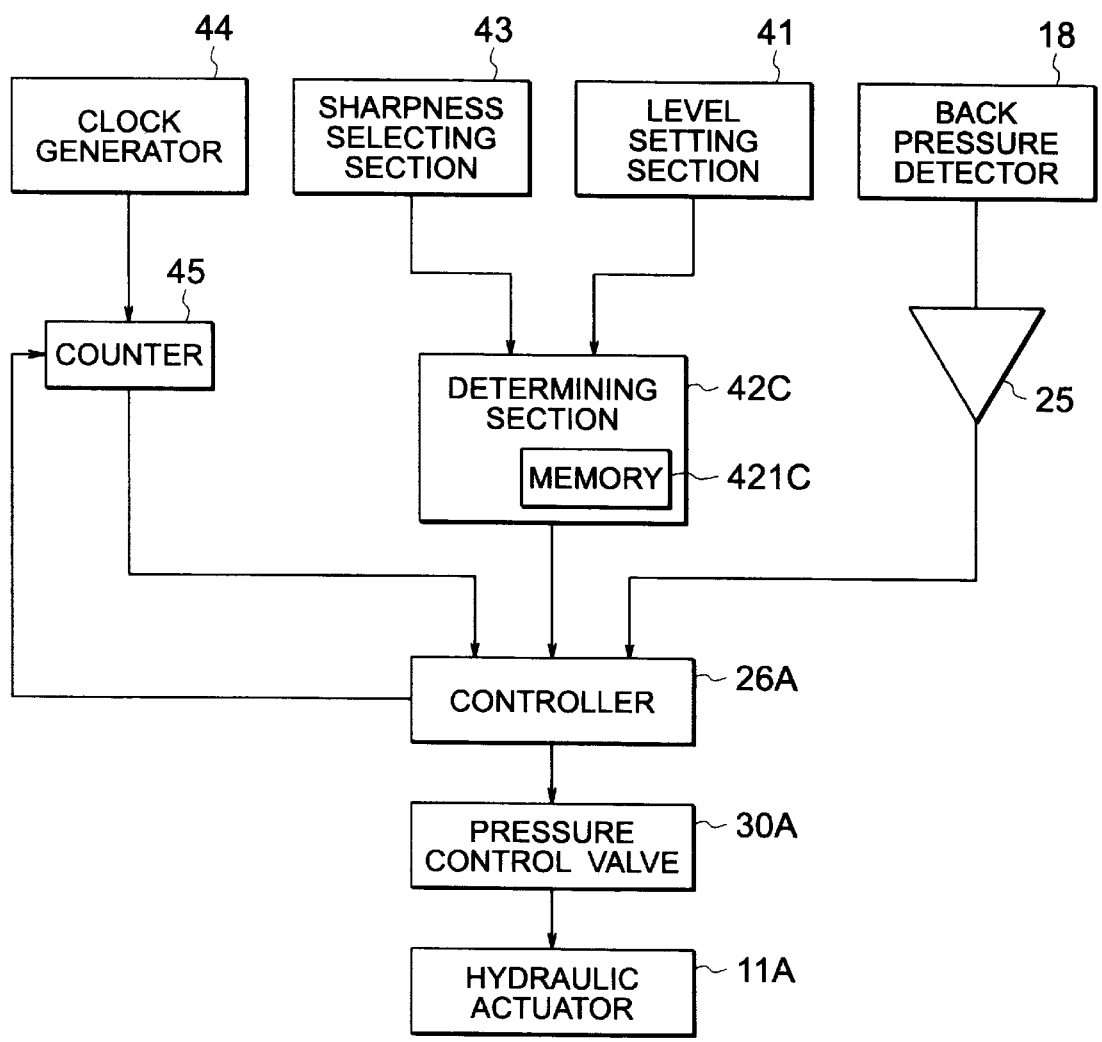
FIG. 24 is a block diagram of a back pressure control apparatus according to an eighth embodiment of this invention.

FIG. 24 illustrates a back pressure control apparatus according to an eighth embodiment of this invention in a case where the back pressure control apparatus is applicable to the hydraulic injection molding machine. The illustrated back pressure control apparatus is similar in structure and operation to that illustrated in FIG. 16 except that the back pressure control apparatus comprises a combination of the hydraulic actuator 11A and the pressure control valve 30A on behalf of a combination of the servomotor 11 and the motor driver 30 illustrated in FIG. 16.

In addition, instead of the load cell, the back pressure detector 18 may be a resin pressure detector disposed on the head portion 20-4 (FIG. 2) of the screw 20. Furthermore, although the description is made as regards in a case where the back pressure pattern has, as the mountain-shaped portions, three types of standard configurations, the back pressure pattern may have, as the mountain-shaped portions, four or more types of standard configurations.

Determining sections 42, 42A, 42B and 42C may be any computer. This computer, for example, may include a microprocessor, a non-volatile memory (for example, a ROM or a hard disk drive) for storage of a program to carry out the calculation or selection of the above-noted patterns and a volatile memory (for example, RAM) to temporary store the program(s) and data. Further, while the figures illustrate the determining section as being separate from the controller, the determining section and controller may be embodied in a single computer.

Level setting section 41 and sharpness selecting section 43 can be any type of computer input device.

Controllers 26 and 26A can be any type of well known controller suitable for the controls described herein, as will be apparent to those skilled in the art. Alternatively, controllers 26 and 26A can be embodied in a computer.

What is claimed is:

1. A back pressure control apparatus for controlling back pressure in an injection molding machine including an injection device having a heating cylinder for heating resin powder therein to melt the resin powder into molten resin, a screw disposed in said heating cylinder for feeding the molten resin in said heating cylinder forward to meter the molten resin, and an injection actuator operatively coupled to said screw for driving said screw along an axial direction to inject the molten resin metered in said heating cylinder forward, said injection device being provided with a back pressure detector for detecting back pressure of the molten resin in said heating cylinder that is metered ahead of said screw to produce a pressure detected signal indicative of a back pressure detected value of the back pressure and with a screw position detector for detecting a retreat position of said screw to produce a screw position detected signal indicative of the retreat position of said screw, said back pressure control apparatus comprising:

level selecting means for selecting a back pressure control level and for outputting a level signal indicative of the selected back pressure control level;

determining means, connected to said level selecting means, for determining, on the basis of the selected back pressure control level indicated by the level signal, a back pressure pattern having a variable back pressure command value which continuously changes with respect to a retreat position of said screw at least at a maximum back pressure command value, said determining means producing a pattern signal indicative of the back pressure pattern; and a controller, connected to said determining means, said back pressure detector, and said screw position detector, and operatively coupled to said injection actuator, for controlling, in response to the pressure detected signal and the screw position detected signal, said back pressure in accordance with the back pressure pattern by means of said injection actuator.

2. A back pressure control apparatus as claimed in claim 1, said injection molding machine including a motor-driven injection molding machine having an injection motor as said injection actuator, wherein said controller carries out control of said back pressure by controlling a current of said injection motor.

3. A back pressure control apparatus as claimed in claim 1, said injection molding machine including a motor-driven injection molding machine having an injection motor as said injection actuator, wherein said controller carries out control of said back pressure by controlling an output torque of said injection motor.

4. A back pressure control apparatus as claimed in claim 1, said injection molding machine including a hydraulic injection molding machine having a hydraulic actuator as said injection actuator, wherein said controller carries out control of said back pressure by controlling hydraulic pressure of said hydraulic actuator.

5. A back pressure control apparatus as claimed in claim 1, wherein said back pressure pattern is defined by the retreat position of said screw in a screw movement stroke between a start of rotation of said screw and a stop of rotation of said screw, said screw movement stroke being divided into a first divided stroke region, a leading divided stroke region, an intermediate divided stroke region, a trailing divided stroke region, and a final divided stroke region, said determining means determining the back pressure pattern having the variable back pressure command value which shifts from a zero back pressure command value to a start low back pressure command value at the first divided stroke region, rises from the start low back pressure command value to the maximum back pressure command value with a predetermined sharpness at the leading divided stroke region, falls relatively gently from the maximum back pressure command value to a medium back pressure command value at the intermediate divided stroke region, falls relatively abruptly from the medium back pressure command value to a final low back pressure command value at the trailing divided stroke region, and shifts from the final low back pressure command value to the zero back pressure command value at the final divided stroke region.

6. A back pressure control apparatus for controlling back pressure in an injection molding machine including an injection device having a heating cylinder for heating resin powder therein to melt the resin powder into molten resin, a screw disposed in said heating cylinder for feeding the molten resin in said heating cylinder forward to meter the molten resin, and an injection actuator operatively coupled to said screw for driving said screw along an axial direction to inject the molten resin metered in said heating cylinder forward, said injection device being provided with a back pressure detector for detecting back pressure of the molten resin in said heating cylinder that is metered ahead of said screw to produce a pressure detected signal indicative of a back pressure detected value of the back pressure and with a screw position detector for detecting a retreat position of said screw to produce a screw position detected signal indicative of the retreat position of said screw, said back pressure control apparatus comprising:

level selecting means for selecting a back pressure control level and for outputting a level signal indicative of the selected back pressure control level;

sharpness selecting means for selecting, as a selected sharpness, one of a plurality of sharpnesses in transition up to a maximum back pressure command value;

determining means, connected to said level selecting means and said sharpness selecting means, for determining, on the basis of the selected back pressure control level indicated by the level signal, a back pressure pattern having a variable back pressure command value which continuously changes with respect to a retreat position of said screw at least at a maximum back pressure command value, the back pressure pattern having a mountain-shaped portion defined by the selected sharpness, said determining means producing a pattern signal indicative of the back pressure pattern; and a controller, connected to said determining means, said back pressure detector, and said screw position detector, and operatively coupled to said injection actuator, for controlling, in response to the pressure detected signal and the screw position detected signal, said back pressure in accordance with the back pressure pattern by means of said injection actuator.

7. A back pressure control apparatus as claimed in claim 6, said injection molding machine including a motor-driven injection molding machine having an injection motor as said injection actuator, wherein said controller carries out control of said back pressure by controlling a current of said injection motor.

8. A back pressure control apparatus as claimed in claim 6, said injection molding machine including a motor-driven injection molding machine having an injection motor as said injection actuator, wherein said controller carries out control of said back pressure by controlling an output torque of said injection motor.

9. A back pressure control apparatus as claimed in claim 6, said injection molding machine including a hydraulic injection molding machine having a hydraulic actuator as said injection actuator, wherein said controller carries out control of said back pressure by controlling hydraulic pressure of said hydraulic actuator.

10. A back pressure control apparatus as claimed in claim 6, wherein said back pressure pattern is defined by the retreat position of said screw in a screw movement stroke between a start of rotation of said screw and a stop of rotation of said screw, said screw movement stroke being divided into a first divided stroke region, a leading divided stroke region, an intermediate divided stroke region, a trailing divided stroke region, and a final divided stroke region, said determining means determining the back pressure pattern having the variable back pressure command value which shifts from a zero back pressure command value to a start low back pressure command value at the first divided stroke region, rises from the start low back pressure command value to the maximum back pressure command value with the selected sharpness at the leading divided stroke region, falls relatively gently from the maximum back pressure command value to a medium back pressure command value at the intermediate divided stroke region, falls relatively abruptly from the medium back pressure command value to a final low back pressure command value at the trailing divided stroke region, and shifts from the final low back pressure command value to the zero back pressure command value at the final divided stroke region.

11. A back pressure pattern preparing unit for preparing a back pressure pattern for controlling back pressure in an injection molding machine including an injection device having a heating cylinder for heating resin powder therein to melt the resin powder into molten resin and a screw disposed in said heating cylinder for feeding the molten resin in said heating cylinder forward to meter the molten resin, said back pressure pattern preparing unit comprising:

level selecting means for selecting a back pressure control level and for outputting a level signal indicative of the selected back pressure control level; and determining means, connected to said level selecting means, for determining, on the basis of the selected back pressure control level indicated by the level signal, the back pressure pattern having a variable back pressure command value which continuously changes with respect to a retreat position of said screw at least at a maximum back pressure command value, said determining means producing a pattern signal indicative of the back pressure pattern.

12. A back pressure pattern preparing unit as claimed in claim 11, wherein said back pressure pattern is defined by the retreat position of said screw in a screw movement stroke between a start of rotation of said screw and a stop of rotation of said screw, said screw movement stroke being divided into a first divided stroke region, a leading divided stroke region, an intermediate divided stroke region, a trailing divided stroke region, and a final divided stroke region, said determining means determining the back pressure pattern having the variable back pressure command value which shifts from a zero back pressure command value to a start low back pressure command value at the first divided stroke region, rises from the start low back pressure command value to the maximum back pressure command value with a predetermined sharpness at the leading divided stroke region, falls relatively gently from the maximum back pressure command value to a medium back pressure command value at the intermediate divided stroke region, falls relatively abruptly from the medium back pressure command value to a final low back pressure command value at the trailing divided stroke region, and shifts from the final low back pressure command value to the zero back pressure command value at the final divided stroke region.

13. A back pressure pattern preparing unit for preparing a back pressure pattern for controlling back pressure in an injection molding machine including an injection device having a heating cylinder for heating resin powder therein to melt the resin powder into molten resin and a screw disposed in said heating cylinder for feeding the molten resin in said heating cylinder forward to meter the molten resin, said back pressure pattern preparing unit comprising:

level selecting means for selecting a back pressure control level and for outputting a level signal indicative of the selected back pressure control level;

sharpness selecting means for selecting, as a selected sharpness, one of a plurality of sharpnesses in transition up to a maximum back pressure command value; and determining means, connected to said level selecting means and said sharpness selecting means, for determining, on the basis of the selected back pressure control level indicated by the level signal, the back pressure pattern having a variable back pressure command value which continuously changes with respect to a retreat position of said screw at least at a maximum back pressure command value, the back pressure pattern having a mountain-shaped portion defined by the selected sharpness, said determining means producing a pattern signal indicative of the back pressure pattern.

14. A back pressure pattern preparing unit as claimed in claim 13, wherein said back pressure pattern is defined by the retreat position of said screw in a screw movement stroke between a start of rotation of said screw and a stop of rotation of said screw, said screw movement stroke being divided into a first divided stroke region, a leading divided stroke region, an intermediate divided stroke region, a trailing divided stroke region, and a final divided stroke region, said determining means determining the back pressure pattern having the variable back pressure command value which shifts from a zero back pressure command value to a start low back pressure command value at the first divided stroke region, rises from the start low back pressure command value to the maximum back pressure command value with the selected sharpness at the leading divided stroke region, falls relatively gently from the maximum back pressure command value to a medium back pressure command value at the intermediate divided stroke region, falls relatively abruptly from the medium back pressure command value to a final low back pressure command value at the trailing divided stroke region, and shifts from the final low back pressure command value to the zero back pressure command value at the final divided stroke region.

15. A back pressure control apparatus for controlling back pressure in an injection molding machine including an injection device having a heating cylinder for heating resin powder therein to melt the resin powder into molten resin, a screw disposed in said heating cylinder for feeding the molten resin in said heating cylinder forward to meter the molten resin, and an injection actuator operatively coupled to said screw for driving said screw along an axial direction to inject the molten resin metered in said heating cylinder forward, said injection device being provided with a back pressure detector for detecting back pressure of the molten resin in said heating cylinder that is metered ahead of said screw to produce a pressure detected signal indicative of a back pressure detected value of the back pressure and with a screw retreat time instant generator for generating a time instant signal indicative of a retreat time instant of said screw, said back pressure control apparatus comprising:

level selecting means for selecting a back pressure control level and for outputting a level signal indicative of the selected back pressure control level;

determining means, connected to said level selecting means, for determining, on the basis of the selected back pressure control level indicated by the level signal, a back pressure pattern having a variable back pressure command value which continuously changes with respect to time at least at a maximum back pressure command value, and for producing a pattern signal indicative of the back pressure pattern; and a controller, connected to said determining means, said back pressure detector, and said screw retreat time instant generator, and operatively coupled to said injection actuator, for controlling, in response to the pressure detected signal and the time instant signal, said back pressure in accordance with the back pressure pattern by means of said injection actuator.

16. A back pressure control apparatus as claimed in claim 15, said injection molding machine including a motor-driven injection molding machine having an injection motor as said injection actuator, wherein said controller carries out control of said back pressure by controlling a current of said injection motor.

17. A back pressure control apparatus as claimed in claim 15, said injection molding machine including a motor-driven injection molding machine having an injection motor as said injection actuator, wherein said controller carries out control of said back pressure by controlling an output torque of said injection motor.

18. A back pressure control apparatus as claimed in claim 15, said injection molding machine including a hydraulic injection molding machine having a hydraulic actuator as said injection actuator, wherein said controller carries out control of said back pressure by controlling hydraulic pressure of said hydraulic actuator.

19. A back pressure control apparatus as claimed in claim 15, wherein said back pressure pattern is defined by the retreat time instant of said screw in a screw movement time interval between a start of rotation of said screw and a stop of rotation of said screw, said screw movement time interval being divided into a first divided time duration, a leading divided time duration, an intermediate divided time duration, a trailing divided time duration, and a final divided time duration, said determining means determining the back pressure pattern having the variable back pressure command value which shifts from a zero back pressure command value to a start low back pressure command value at the first divided time duration, rises from the start low back pressure command value to the maximum back pressure command value with a predetermined sharpness at the leading divided time duration, falls relatively gently from the maximum back pressure command value to a medium back pressure command value at the intermediate divided time duration, falls relatively abruptly from the medium back pressure command value to a final low back pressure command value at the trailing divided time duration, and shifts from the final low back pressure command value to the zero back pressure command value at the final divided time duration.

20. A back pressure control apparatus for controlling back pressure in an injection molding machine including injection device having a heating cylinder for heating resin powder therein to melt the resin powder into molten resin, a screw disposed in said heating cylinder for feeding the molten resin in said heating cylinder forward to meter the molten resin, and an injection actuator operatively coupled to said screw for driving said screw along an axial direction to inject the molten resin metered in said heating cylinder forward, said injection device being provided with a back pressure detector for detecting back pressure of the molten resin in said heating cylinder that is metered ahead of said screw to produce a pressure detected signal indicative of a back pressure detected value of the back pressure and with a screw retreat time instant generator for generating a time instant signal indicative of a retreat time instant of said screw, said back pressure control apparatus comprising:

level selecting means for selecting a back pressure control level and for outputting a level signal indicative of the selected back pressure control level;

sharpness selecting means for selecting, as a selected sharpness, one of a plurality of sharpnesses in transition up to a maximum back pressure command value;

determining means, connected to said level selecting means and said sharpness selecting means, for determining, on the basis of the selected back pressure control level indicated by the level signal, a back pressure pattern having a variable back pressure command value which continuously changes with respect to time at least at a maximum back pressure command value, the back pressure pattern having a mountain-shaped portion defined by the selected sharpness, said determining means producing a pattern signal indicative of the back pressure pattern; and a controller, connected to said determining means, said back pressure detector, and said screw retreat time instant generator, and operatively coupled to said injection actuator, for controlling, in response to the pressure detected signal and the time instant signal, said back pressure in accordance with the back pressure pattern by means of said injection actuator.

21. A back pressure control apparatus as claimed in claim 20, said injection molding machine including a motor-driven injection molding machine having an injection motor as said injection actuator, wherein said controller carries out control of said back pressure by controlling a current of said injection motor.

22. A back pressure control apparatus as claimed in claim 20, said injection molding machine including a motor-driven injection molding machine having an injection motor as said injection actuator, wherein said controller carries out control of said back pressure by controlling an output torque of said injection motor.

23. A back pressure control apparatus as claimed in claim 20, said injection molding machine including a hydraulic injection molding machine having a hydraulic actuator as said injection actuator, wherein said controller carries out control of said back pressure by controlling hydraulic pressure of said hydraulic actuator.

24. A back pressure control apparatus as claimed in claim 20, wherein said back pressure pattern is defined by the retreat time instant of said screw in a screw movement time interval between a start of rotation of said screw and a stop of rotation of said screw, said screw movement time interval being divided into a first divided time duration, a leading divided time duration, an intermediate divided time duration, a trailing divided time duration, and a final divided time duration, said determining means determining the back pressure pattern having the variable back pressure command value which shifts from a zero back pressure command value to a start low back pressure command value at the first divided time duration, rises from the start low back pressure command value to the maximum back pressure command value with the selected sharpness at the leading divided time duration, falls relatively gently from the maximum back pressure command value to a medium back pressure command value at the intermediate divided time duration, falls relatively abruptly from the medium back pressure command value to a final low back pressure command value at the trailing divided time duration, and shifts from the final low back pressure command value to the zero back pressure command value at the final divided time duration.

25. A back pressure pattern preparing unit for preparing a back pressure pattern for controlling back pressure in an injection molding machine including an injection device having a heating cylinder for heating resin powder therein to melt the resin powder into molten resin and a screw disposed in said heating cylinder for feeding the molten resin in said heating cylinder forward to meter the molten resin, said back pressure pattern preparing unit comprising:

level selecting means for selecting a back pressure control level and for outputting a level signal indicative of the selected back pressure control level; and determining means, connected to said level selecting means, for determining, on the basis of the selected back pressure control level indicated by the level signal, the back pressure pattern having a variable back pressure command value which continuously changes with respect to time at least at a maximum back pressure command value, said determining means producing a pattern signal indicative of the back pressure pattern.

26. A back pressure pattern preparing unit as claimed in claim 25, wherein said back pressure pattern is defined by the retreat time instant of said screw in a screw movement time interval between a start of rotation of said screw and a stop of rotation of said screw, said screw movement time interval being divided into a first divided time duration, a leading divided time duration, an intermediate divided time duration, a trailing divided time duration, and a final divided time duration, said determining means determining the back pressure pattern having the variable back pressure command value which shifts from a zero back pressure command value to a start low back pressure command value at the first divided time duration, rises from the start low back pressure command value to the maximum back pressure command value with a predetermined sharpness at the leading divided time duration, falls relatively gently from the maximum back pressure command value to a medium back pressure command value at the intermediate divided time duration, falls relatively abruptly from the medium back pressure command value to a final low back pressure command value at the trailing divided time duration, and shifts from the final low back pressure command value to the zero back pressure command value at the final divided time duration.

27. A back pressure pattern preparing unit for preparing a back pressure pattern for controlling back pressure in an injection molding machine including injection device having a heating cylinder for heating resin powder therein to melt the resin powder into molten resin and a screw disposed in said heating cylinder for feeding the molten resin in said heating cylinder forward to meter the molten resin, said back pressure pattern preparing unit comprising:

level selecting means for selecting a back pressure control level and for outputting a level signal indicative of the selected back pressure control level;

sharpness selecting means for selecting, as a selected sharpness, one of a plurality of sharpnesses in transition up to a maximum back pressure command value; and determining means, connected to said level selecting means and said sharpness selecting means, for determining, on the basis of the selected back pressure control level indicated by the level signal, the back pressure pattern having a variable back pressure command value which continuously changes with respect to time at least at a maximum back pressure command value, the back pressure pattern having a mountain-shaped portion defined by the selected sharpness, said determining means producing a pattern signal indicative of the back pressure pattern.

28. A back pressure pattern preparing unit as claimed in claim 27, wherein said back pressure pattern is defined by the retreat time instant of said screw in a screw movement time interval between a start of rotation of said screw and a stop of rotation of said screw, said screw movement time interval being divided into a first divided time duration, a leading divided time duration, an intermediate divided time duration, a trailing divided time duration, and a final divided time duration, said determining means determining the back pressure pattern having the variable back pressure command value which shifts from a zero back pressure command value to a start low back pressure command value at the first divided time duration, rises from the start low back pressure command value to the maximum back pressure command value with the selected sharpness at the leading divided time duration, falls relatively gently from the maximum back pressure command value to a medium back pressure command value at the intermediate divided time duration, falls relatively abruptly from the medium back pressure command value to a final low back pressure command value at the trailing divided time duration, and shifts from the final low back pressure command value to the zero back pressure command value at the final divided time duration.

* * * * *